April 28, 1970    J. S. SHAW ET AL    3,509,324
TEST GRADING MACHINE
Original Filed July 18, 1963    21 Sheets-Sheet 13
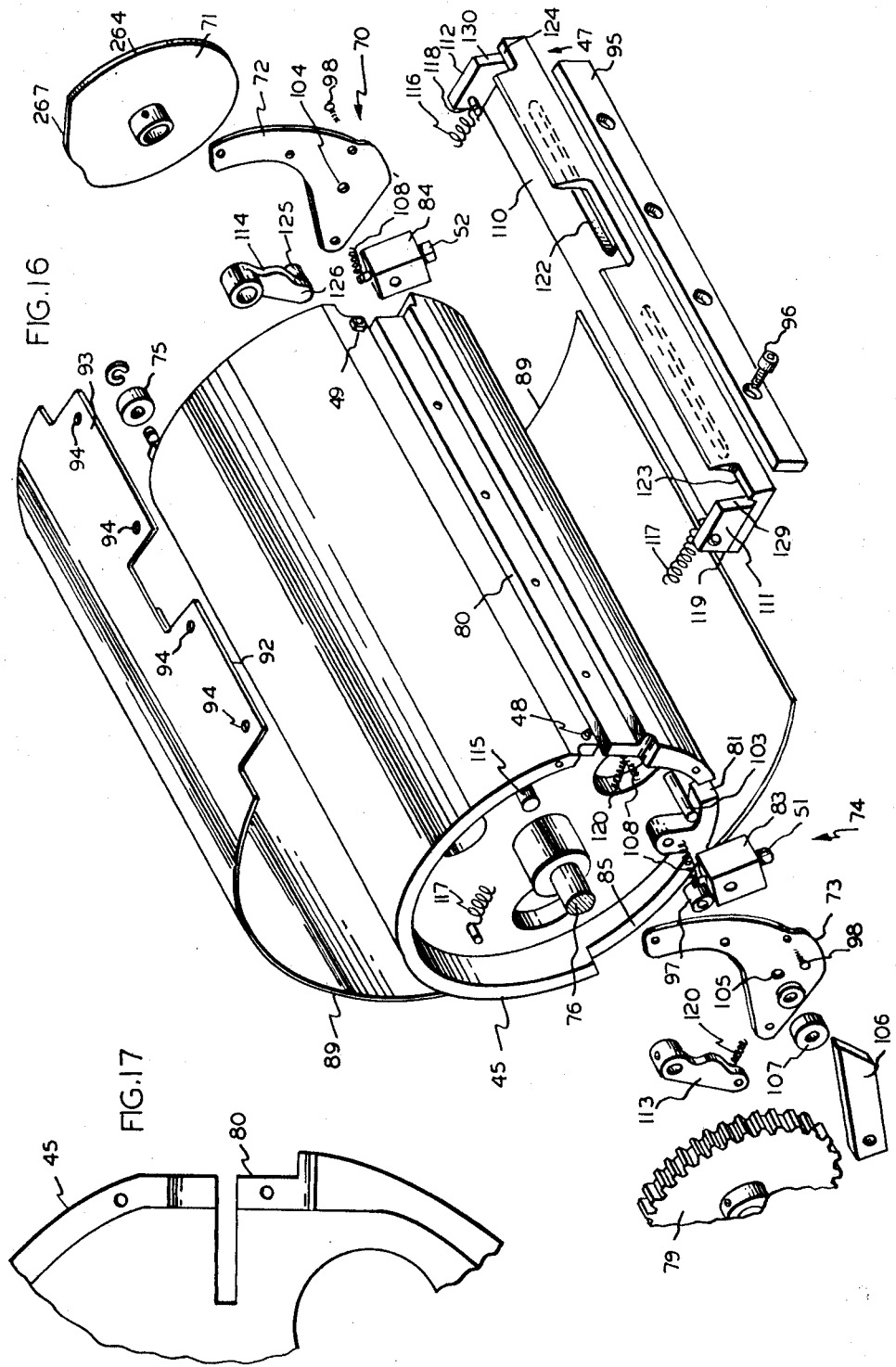

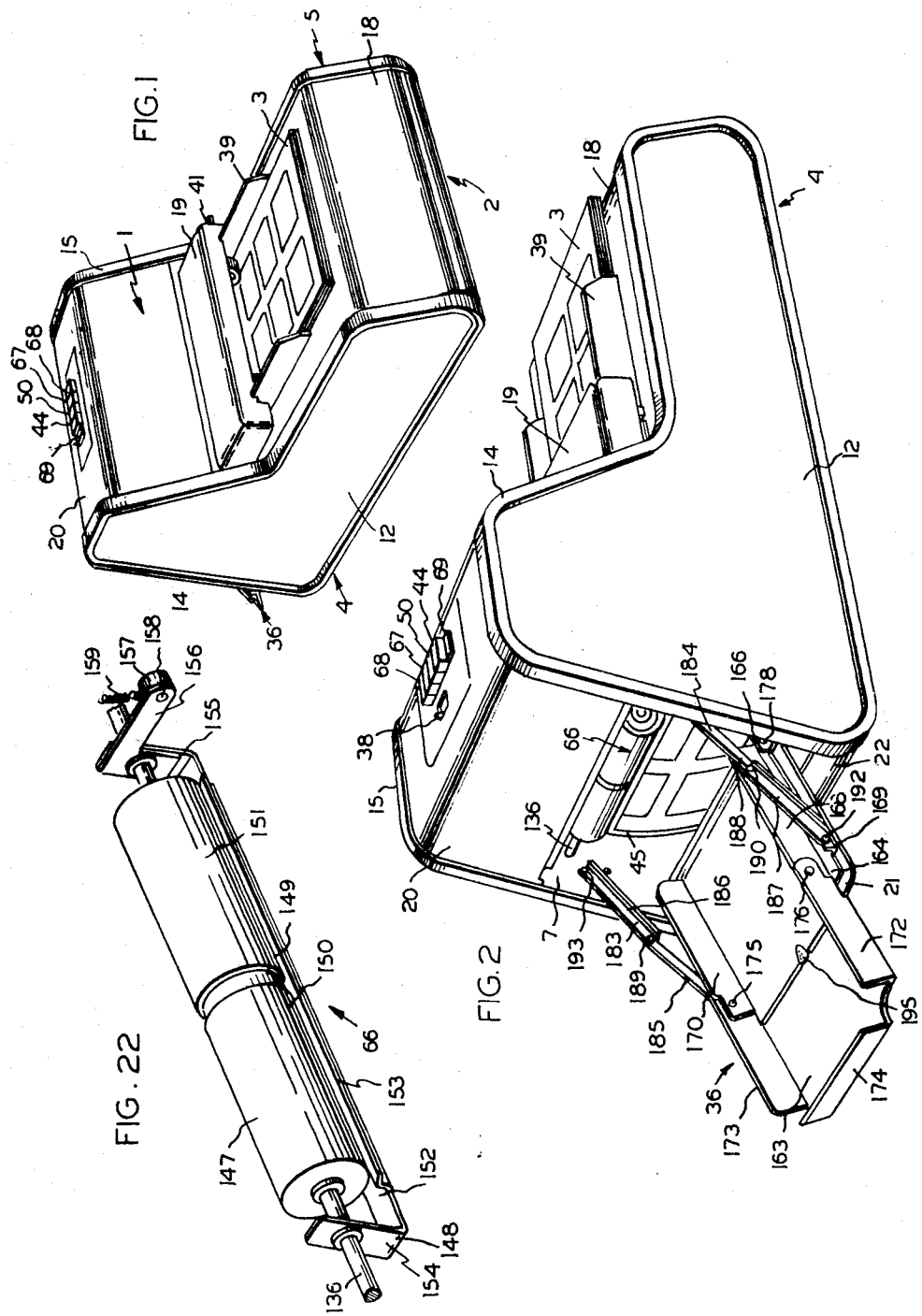

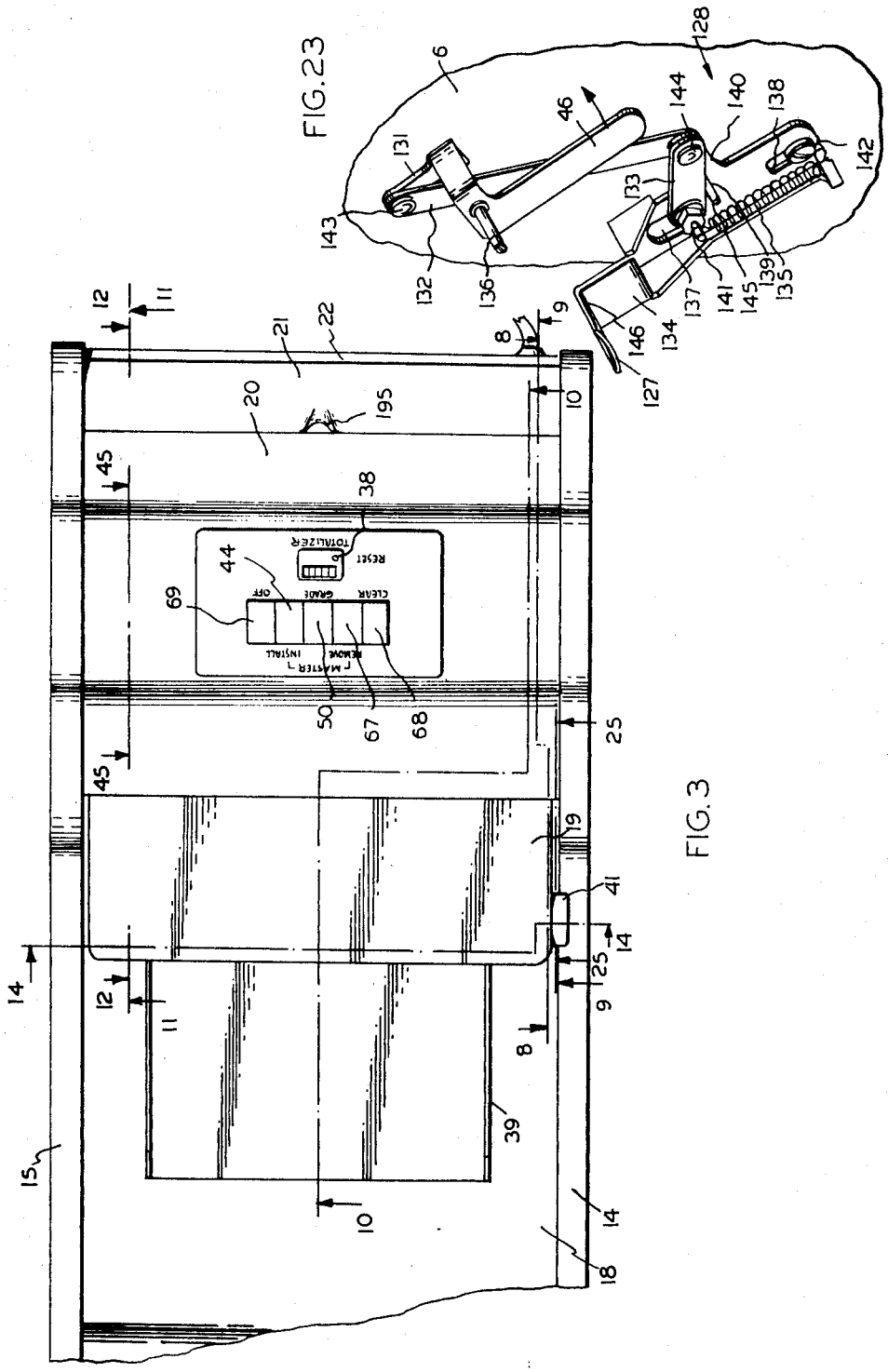

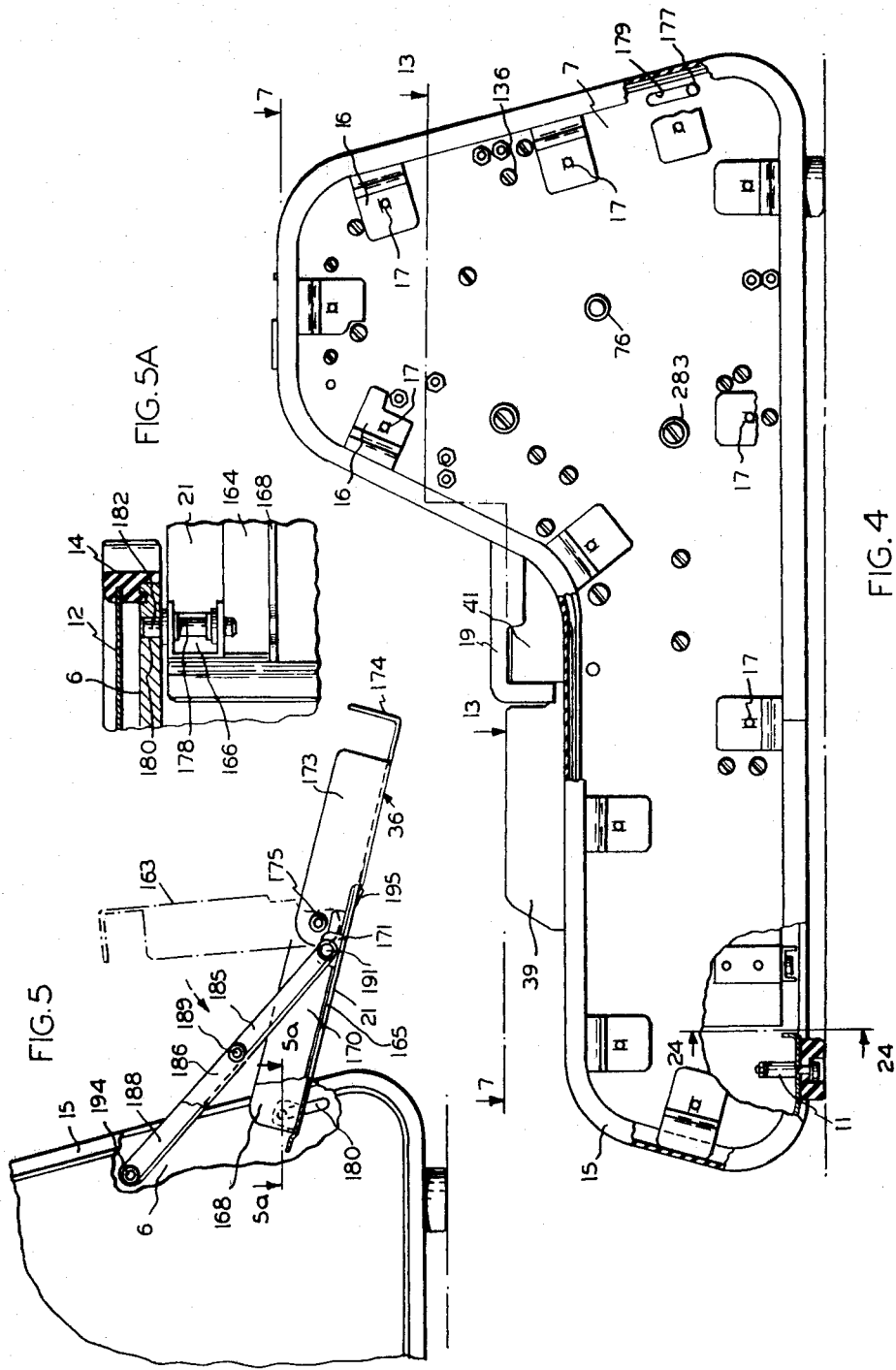

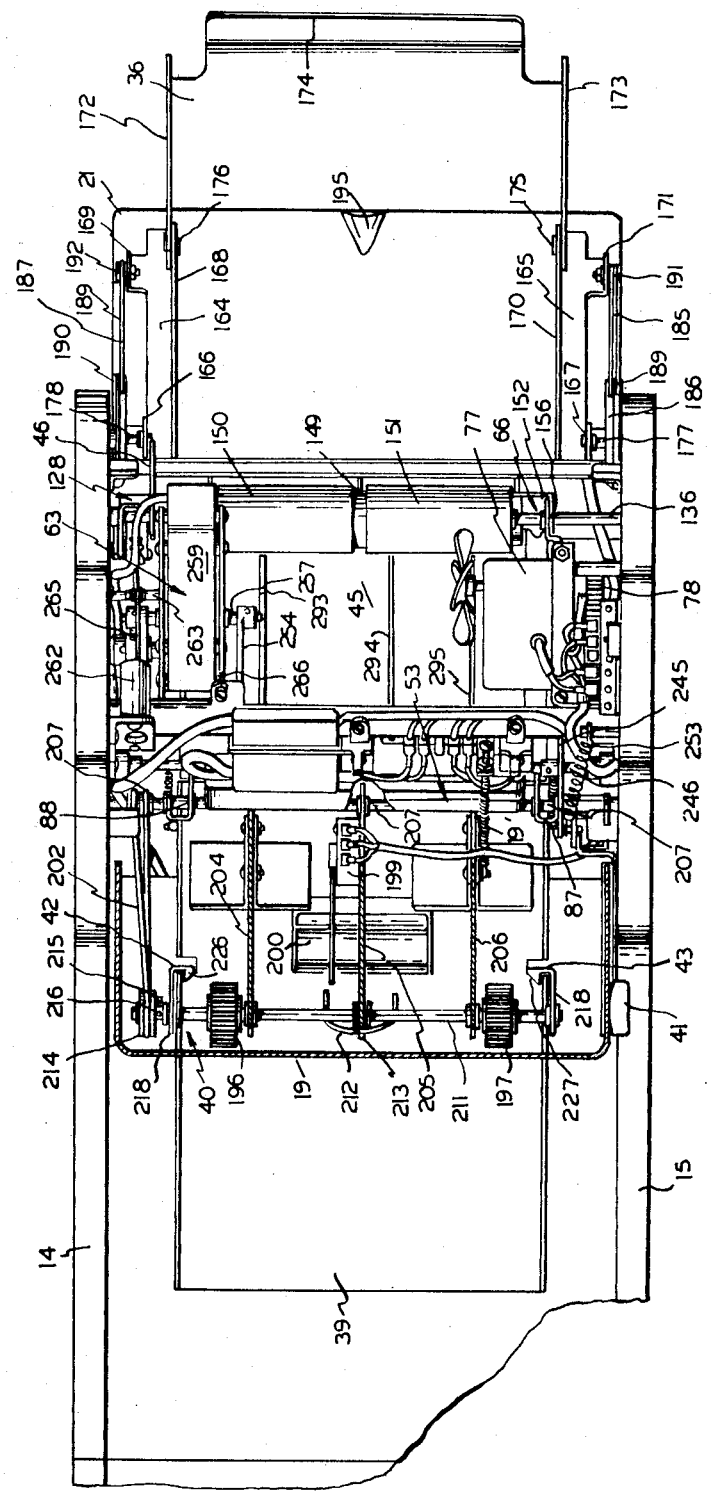

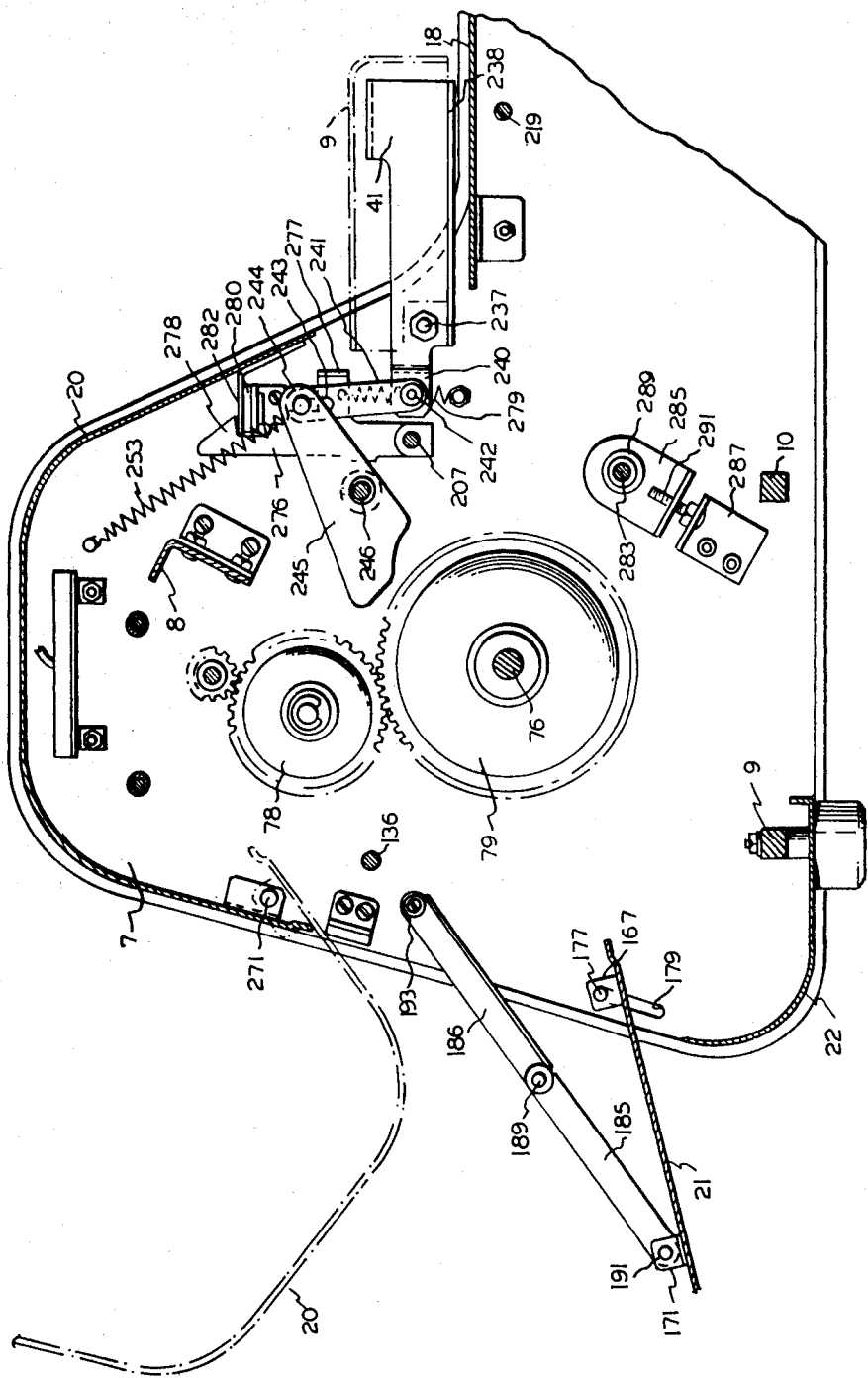

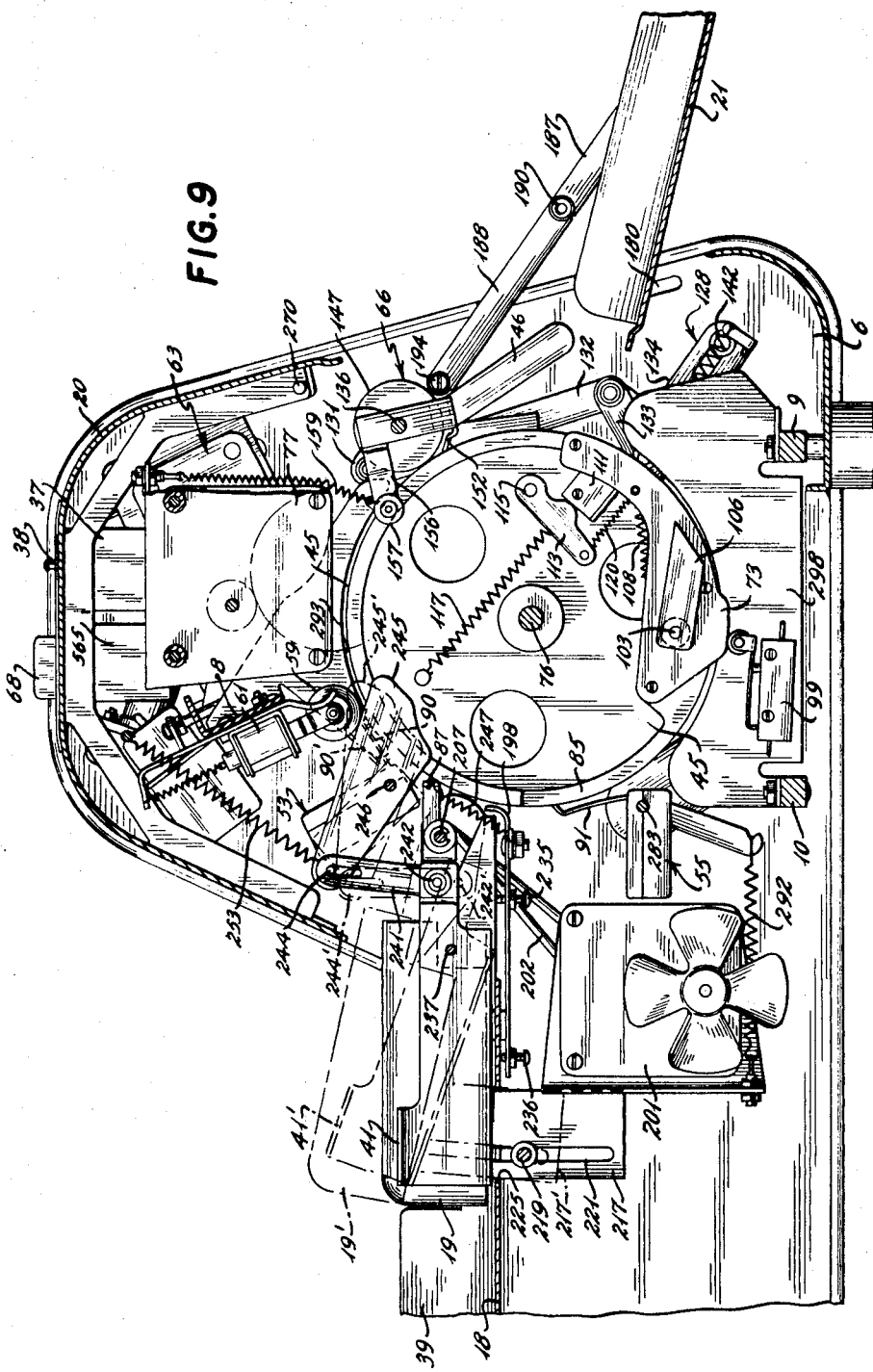

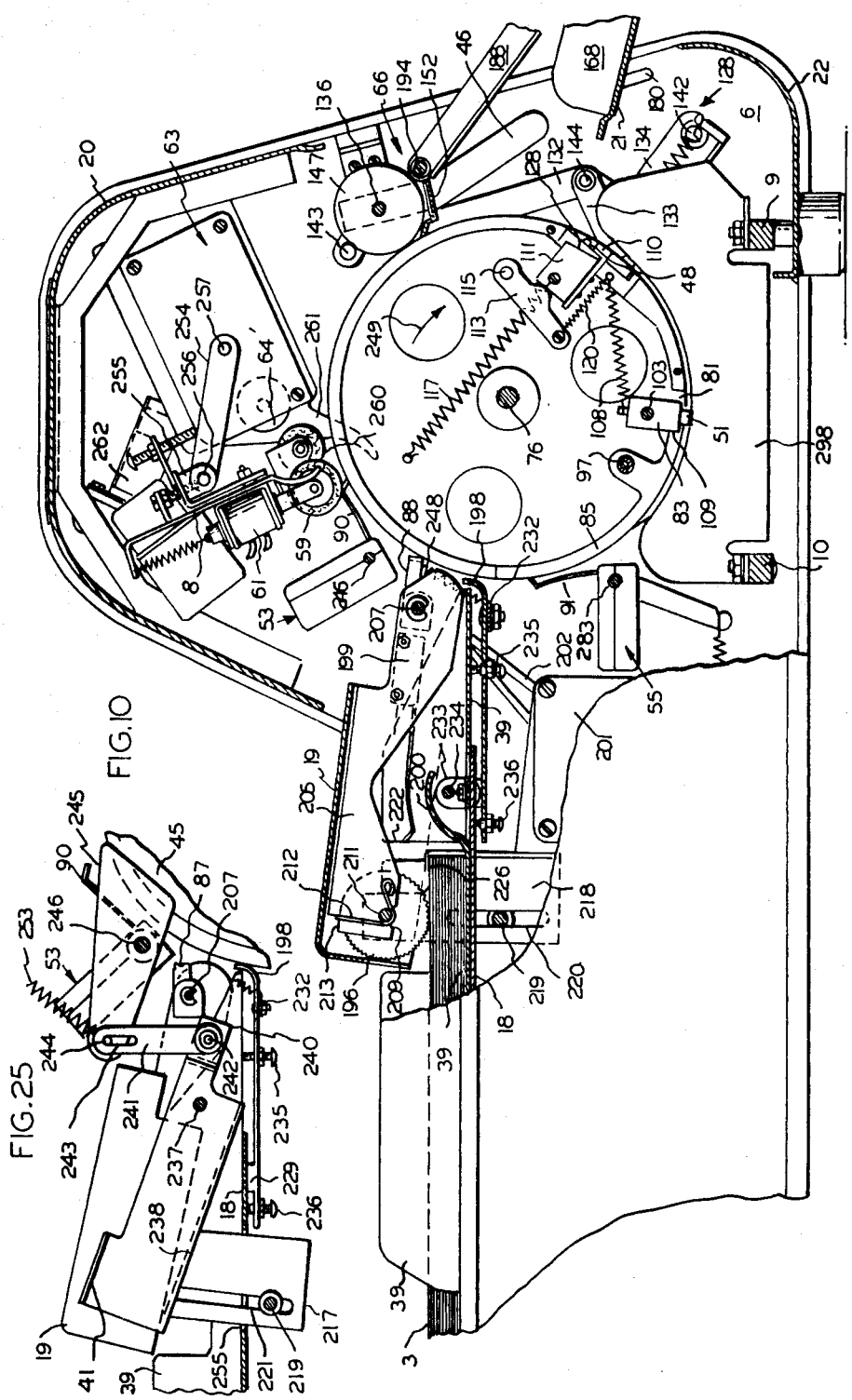

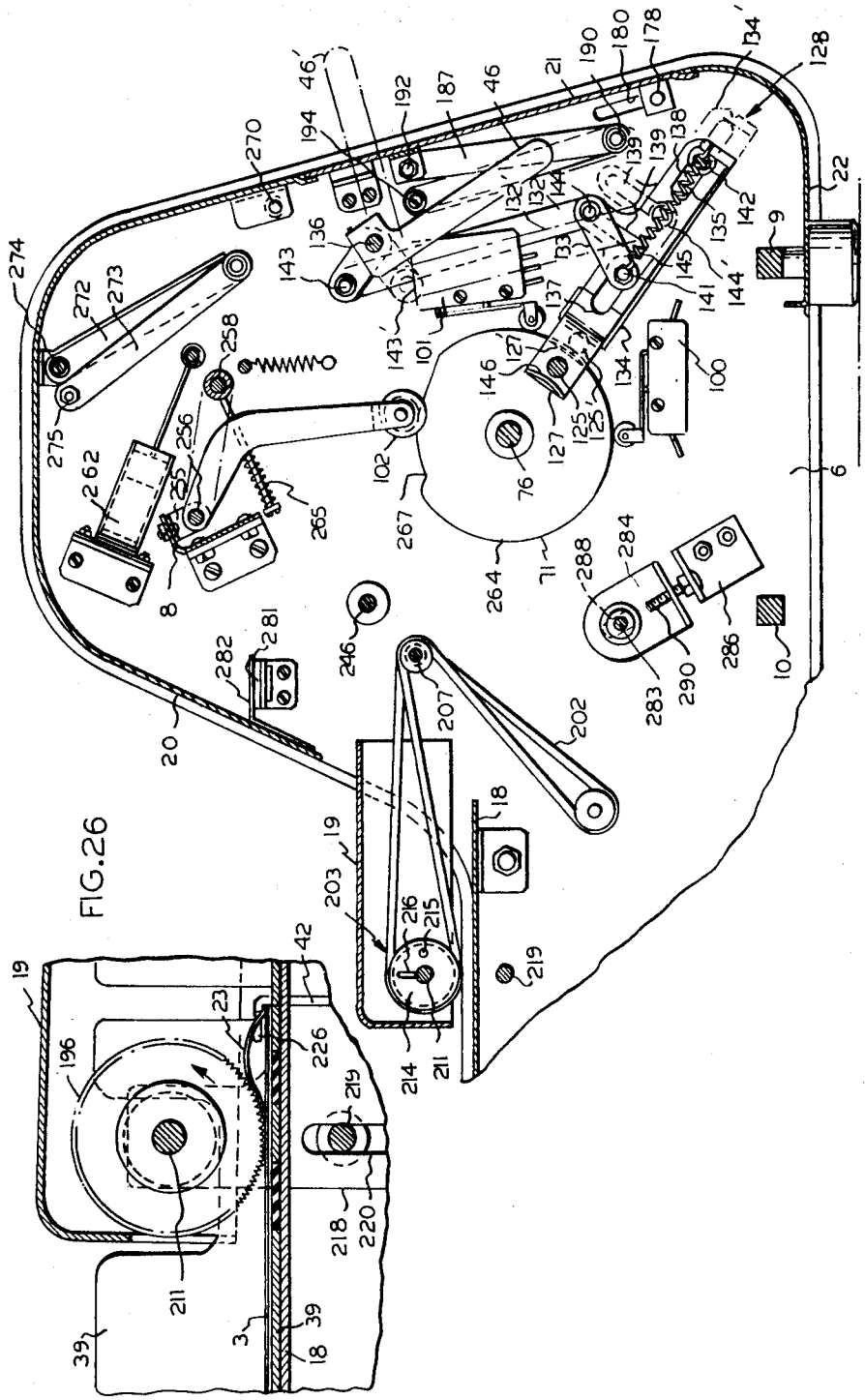

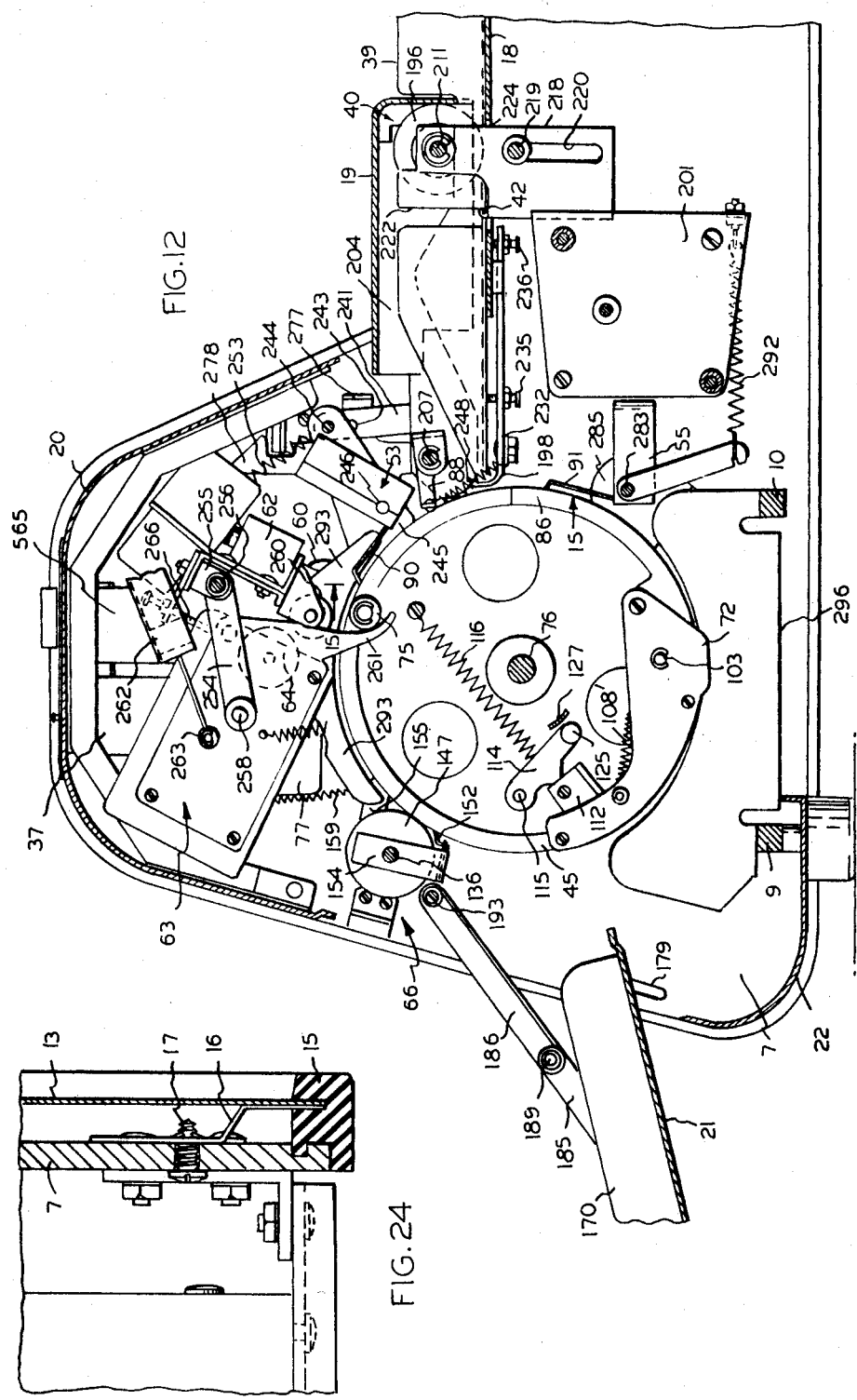

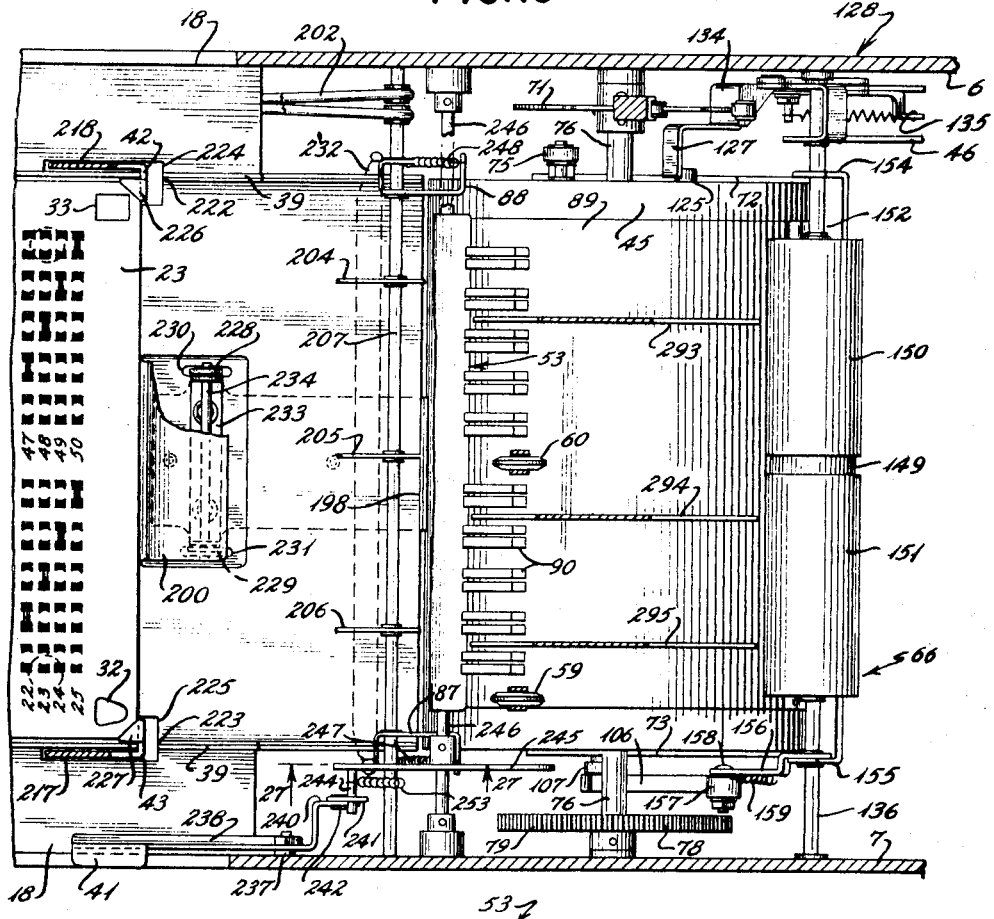

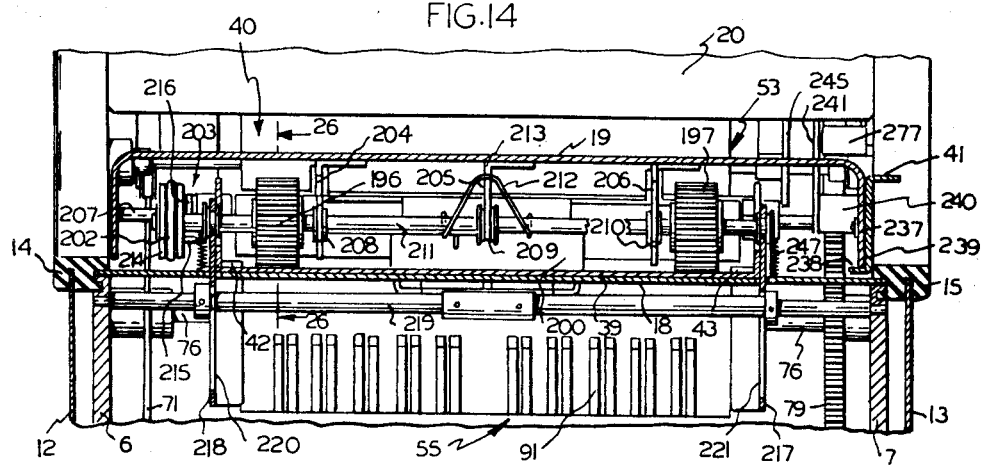
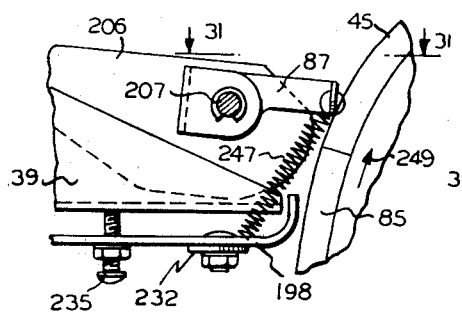
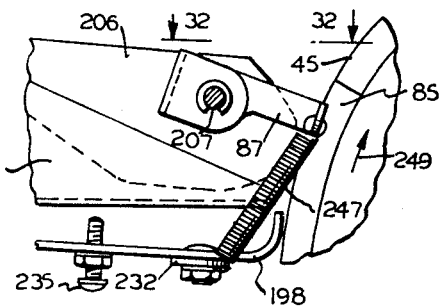
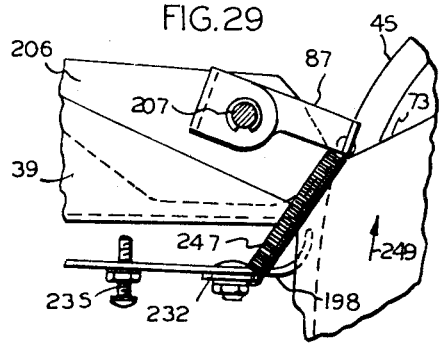
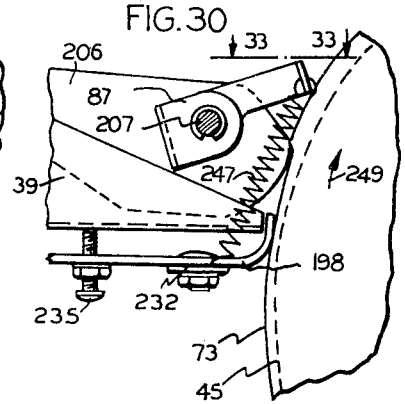
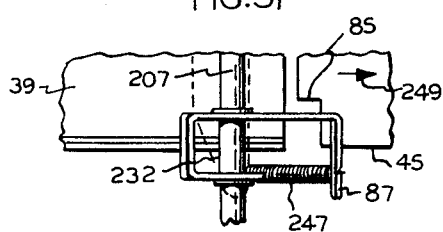

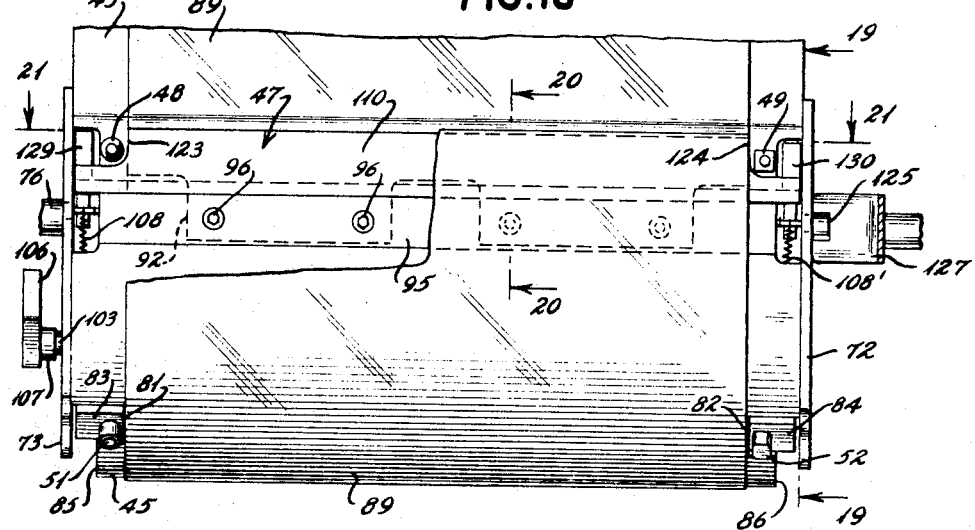
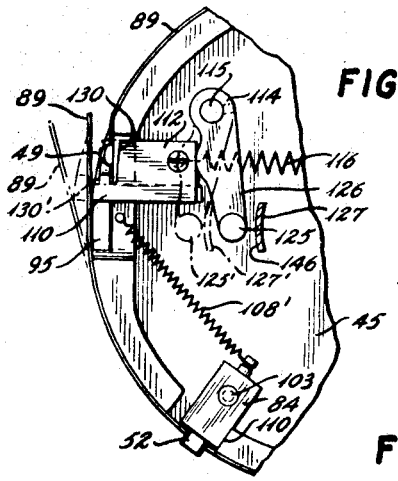
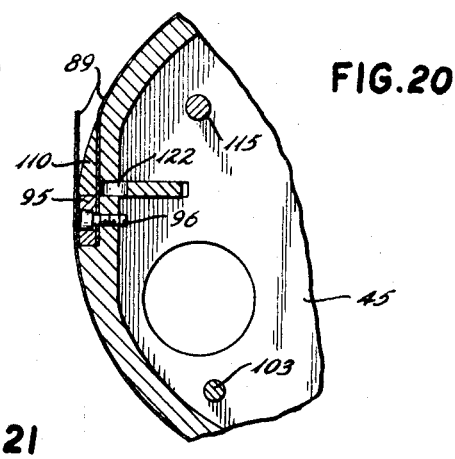
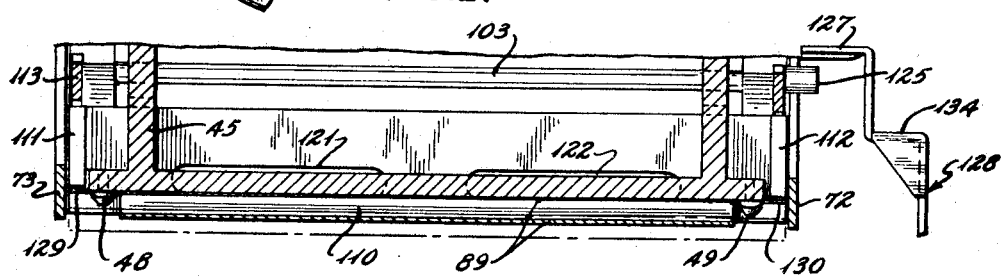

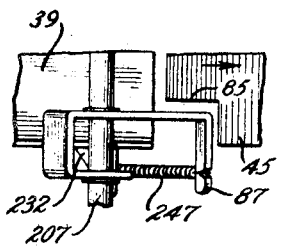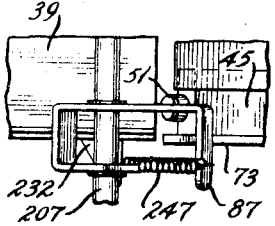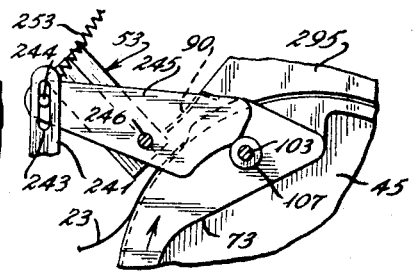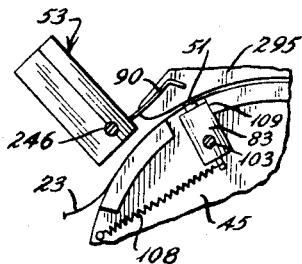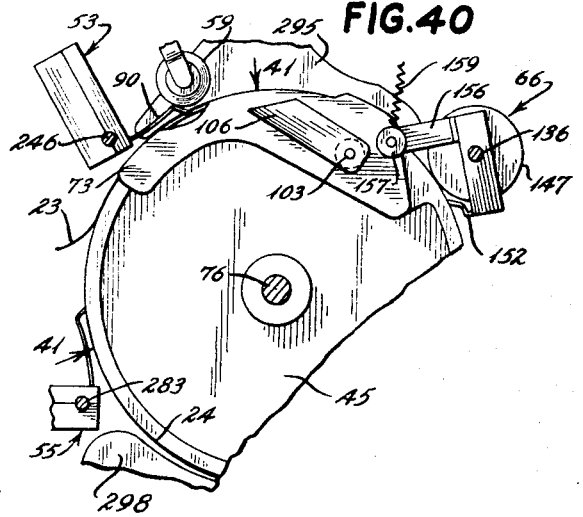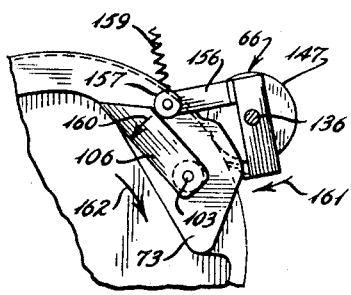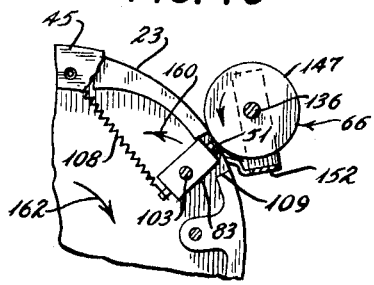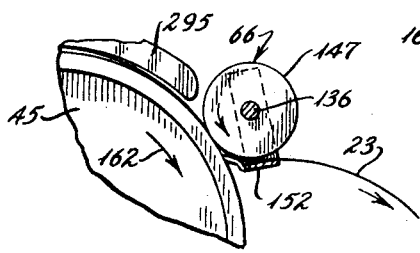

April 28, 1970   J. S. SHAW ET AL   3,509,324
TEST GRADING MACHINE
Original Filed July 18, 1963   21 Sheets-Sheet 19
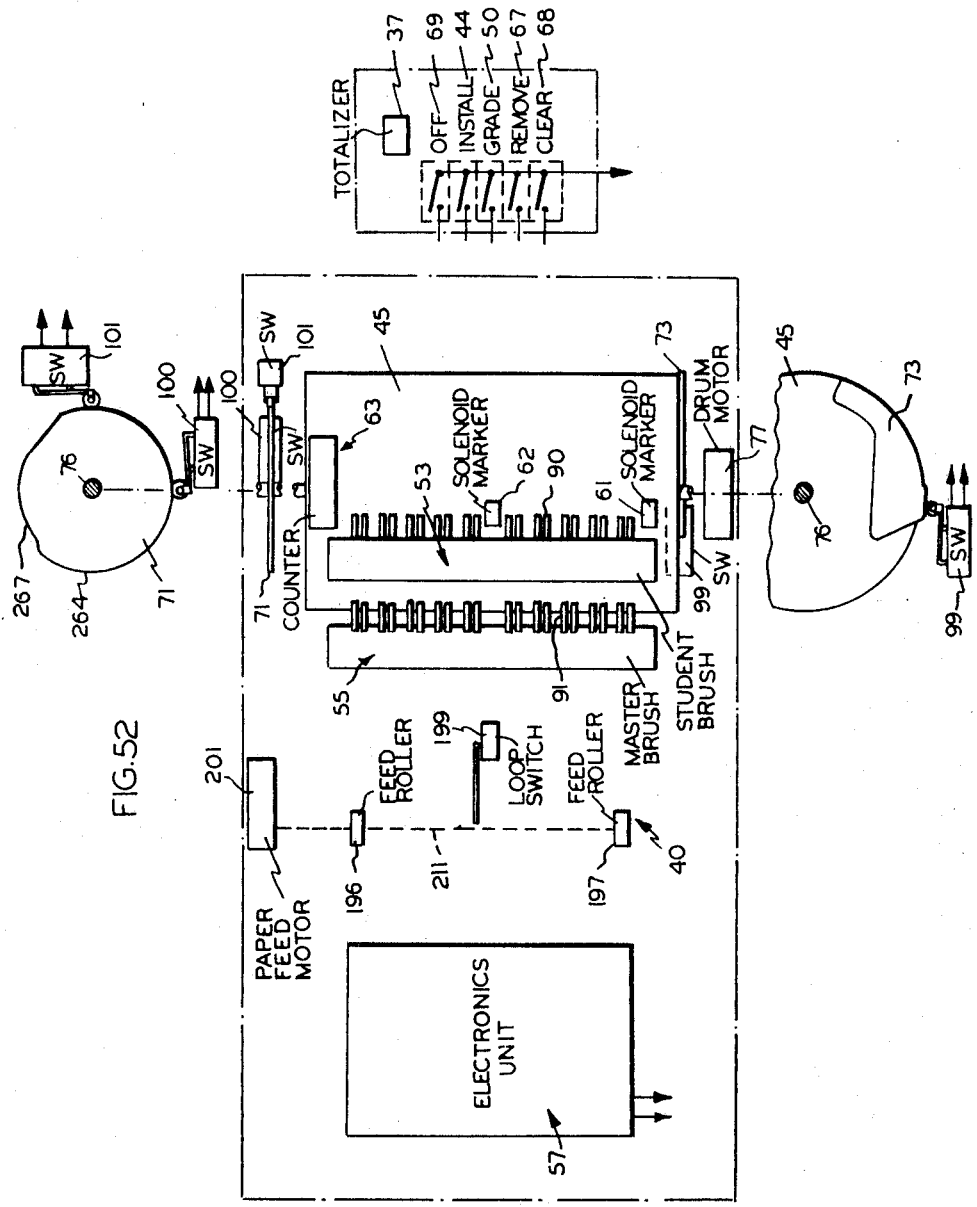

United States Patent Office 3,509,324
Patented Apr. 28, 1970

3,509,324
TEST GRADING MACHINE
John S. Shaw, Kensington, Md., John J. Dostel, Garden City, N.Y., Donald K. White, Fairfax, Va., Edwin S. Elste, Silver Spring, and John F. Kellogg, Bethesda, Md., and John D. O'Neale, Arlington, Va., assignors, by mesne assignments, to Acme Visible Records, Inc., Crozet, Va., a corporation of Delaware
Original application July 18, 1963, Ser. No. 296,071, now Patent No. 3,324,576. Divided and this application Mar. 14, 1967, Ser. No. 632,872
Int. Cl. G06k 5/00
U.S. Cl. 235—61.7     10 Claims This application is a division of application Ser. No. 296,071, now Patent No. 3,324,576.

This invention relates to a test grading machine. More specifically, it relates to a test scoring machine of a type wherein student test sheets are automatically fed through the machine, and electronically graded and marked in conformity with a master test sheet prepared by a teacher.

Various suggestions may be found in the prior art to employ an automatic machine to grade student answer sheets which have been marked by a student in various ways, such as by punching holes in, or placing pencil marks on designated areas of the sheet. Exemplary of patents disclosing machines to automatically grade student sheets of the punched hole variety is the patent to Sveda et al. 2,048,976. In machines of this general type the punched student sheet to be graded and a key or master sheet are passed in a superposed relationship by a scanning point at which are disposed a plurality of electrically conductive feelers, one for each possible answer to a question. An obvious disadvantage of a machine of this type is the requirement that the student answer sheets be punched, thus making it impossible for a student to change his answer after it is once selected and indicated by a punched hole. Further difficulty has been encountered in this type of machine with breaking and deformation of the sensing feelers which tend to catch within the punched holes provided in the student sheets.

Exemplary of various types of machines employed to grade student sheets of the type whereon a student indicates his choice of answers by appropriate pencil marks, are machines disclosed by such patents as Warren 2,010,653, Johnson 2,310,437 and Lindquist 3,050,248. In some of these machines a plurality of photoelectric cells are adapted to sense ordinary pencil marks on the student sheet, while in others electrical contact fingers of the like are placed so as to engage student answers formed with a pencil having an electrical conductive lead. These machines are an advancement over the punched hole sensing machines, inasmuch as the possibility of damage to the student answer sensing feelers is alleviated, and the student may selectively change his answers by completely erasing a former answer.

However, there has been no wide acceptance of any of these prior test grading machines for use in schools, or in small industrial or governmental test facilities, because of such customer influencing factors as cost, large bulky size and complexity of operation. Further, as in the case of test grading machines of the type adapted to sense student answer marks made with a graphite pencil, no satisfactory means was available to properly and accurately compare student answers with those appearing on a master reference.

It is now proposed to provide a test grading machine for use in schools or in small testing facilities, which is not subject to the foregoing objections.

It is accordingly an object of this invention to provide a fully automatic machine whereby sheets, on which students have indicated their answers to questions propounded, are individually and successively scanned and checked with answers appearing upon a master test sheet prepared by a teacher, and both individual incorrect answers and the total of such incorrect answers are imprinted upon each sheet, so that the teacher may determine the rating of a student.

Another object of the invention is to provide a test grading machine having a rotatable drum, means to removably carry a master test sheet on the drum, means to feed a series of student test sheets successively onto the surface of the drum, means to sense answer marks placed on the master sheet, separate means to sense answer marks placed on each successively fed student sheet as it is carried by the drum, means to electronically compare the sensed answer marks, means to grade each student sheet, means for removing each student sheet from the surface of the drum, and means for storing the graded student sheets.

A further object of the invention is to provide means for accurately feeding successive sheets into registering relationship with sheet carrying means carried by a rotatable drum.

Another object of the invention is to provide a system for controlling rotation of a drum, which is successively fed with a plurality of student sheets at a predetermined position during the drum rotation cycle, whereby drum rotation ceases if the sheet supply is exhausted or if the sheets become jammed.

Another object is to provide a system for scanning student tests sheets having conducting answer marks thereon, which papers are fed to a rotating drum carrying conducting indications of the correct answers.

Yet an additional object of the invention is to provide a new and improved system for comparing electrically conducting marks on a sheet of raw data with electrically conducting marks on a reference indicator.

Still a further object of the present invention is to provide a system for grading examination papers having high impedance electrically conducting marks thereon by feeding a weak current through the mark selected and accumulating said current with a reactance to subsequently obtain a strong current pulse considerably in excess of the weak current.

Still another object is to provide a new and improved system for grading student test sheets wherein wrong answer indications for each question are given if the answer (1) fails to agree with the right answer (2) occupies more than one marking space; or (3) is not given.

Further objects and advantages of the present invention will appear in the following description, taken with the accompanying drawings, in which:

FIG. 1 is a perspective view showing the front and left side portions of a machine according to the invention;

FIG. 2 is a perspective view showing the rear and left side portions of a machine according to the invention with the back door sheet-receiving tray in lowered position;

FIG. 3 is a plan view of a machine according to the invention;

FIG. 4 is a side elevational view of the right hand side of the machine with the side cover panel removed;

FIG. 5 is a partially broken away side elevational view showing the back door sheet receiving tray in lowered position;

FIG. 5a is a fragmentary view taken along line 5a of FIG. 5;

FIG. 7 is a sectional view taken along line 7—7 of FIG. 4, but showing the back door-sheet-receiving tray in lowered position;

FIG. 8 is a fragmentary sectional view, taken generally along line 8—8 in FIG. 3;

FIG. 9 is a fragmentary sectional view, taken generally along line 9—9 in FIG. 3;

FIG. 10 is a fragmentary sectional view, taken generally along a line 10—10 in FIG. 3;

FIG. 11 is a sectional view, taken generally along line 11—11 in FIG. 3;

FIG. 12 is a sectional view, taken generally along line 12—12 in FIG. 3;

FIG. 13 is a sectional view, taken generally along line 13—13 in FIG. 4;

FIG. 14 is a fragmentary sectional view taken generally along a line 14—14 in FIG. 3;

FIG. 15 is a fragmentary sectional view, taken generally along line 15—15 in FIG. 12;

FIG. 16 is an exploded perspective view of the master drum assembly;

FIG. 17 is a fragmentary view of the master drum showing the master sheet clamping mechanism removed;

FIG. 18 is a plan view showing the master sheet clamping mechanism installed on the master drum;

FIG. 19 is a fragmentary view taken along line 19—19 in FIG. 18;

FIG. 20 is a fragmentary sectional view taken along line 20—20 in FIG. 18;

FIG. 21 is a fragmentary sectional view taken along line 21—21 in FIG. 18;

FIG. 22 is a perspective view of the student sheet stripper mechanism;

FIG. 23 is a perspective view of a master clamp release mechanism;

FIG. 24 is a fragmentary sectional view taken along line 24—24 in FIG. 4;

FIG. 25 is a fragmentary sectional view taken along line 25—25 in FIG. 3;

FIG. 26 is a fragmentary sectional view taken along line 26—26 in FIG. 14;

FIGS. 27, 28, 29 and 30 are fragmentary sectional views generally taken along line 27—27 in FIG. 13, showing the relative positions of the primary and secondary gates;

FIG. 31 is a fragmentary sectional view taken along line 31—31 in FIG. 27;

FIG. 32 is a fragmentary sectional view generally taken along line 32—32 in FIG. 28;

FIG. 33 is a fragmentary sectional view generally taken along line 33—33 in FIG. 30;

FIG. 38 is a fragmentary view showing the student brush cam follower in contact with the student brush cam;

FIG. 39 is a view illustrating the student sensing brushes in raised position;

FIG. 40 is a view illustrating the position of the master drum relative to the master sensing brushes and student sensing brushes during the grading operation;

FIG. 42 is a fragmentary view showing the student pin cam in contact with the cam follower of the stripper assembly;

FIG. 43 is a view illustrating the student pins in depressed position as the student sheet is stripped from the master drum;

FIG. 44 is a view illustrating the motion of the student sheet as it is stripped from the master drum;

FIG. 52 is a diagrammatic view illustrating the primary electrical components employed in the machine of the present invention;

Figure 6:
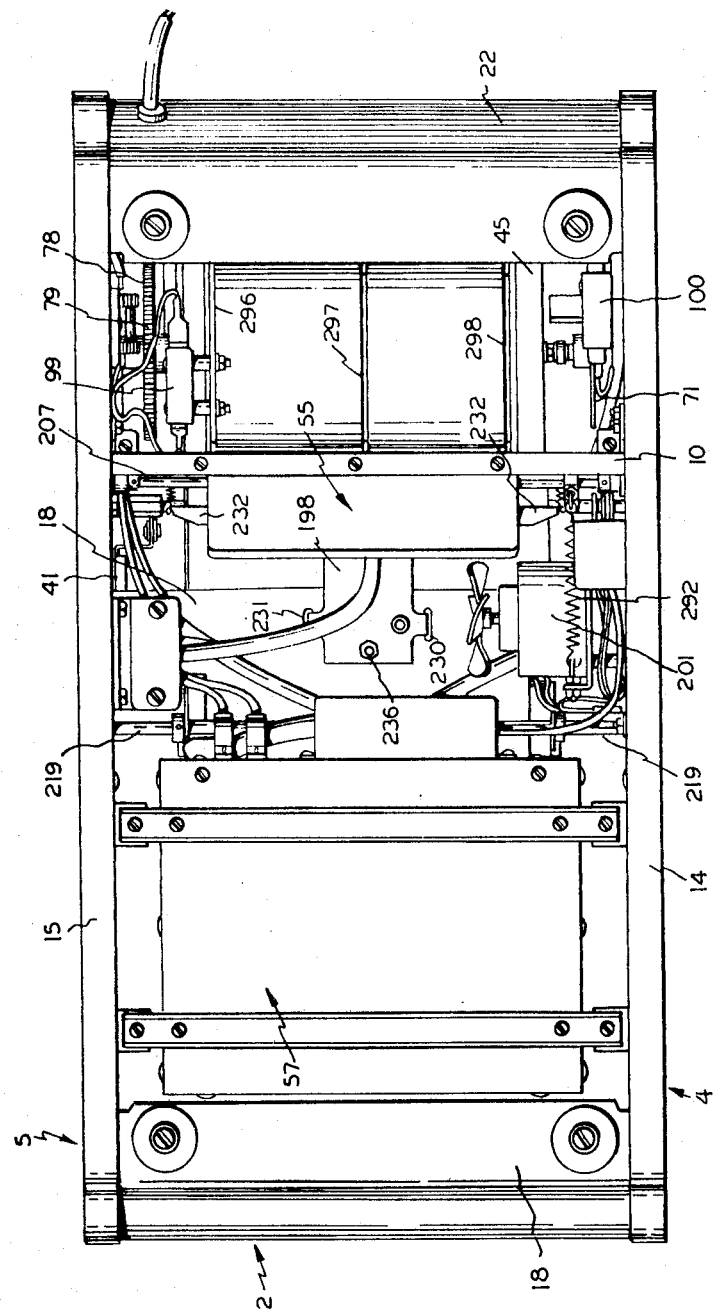
FIG. 6 is a bottom plan view of a machine according to the invention.

As seen in FIGURES 1 and 2, the machine 1 of the present invention has a front end 2 where a stack of student sheets 3 are placed to be graded. Accordingly, the left hand side of the machine 4 and the right hand side of the machine 5 are established when looking at machine from front end 2.

The machine 1 is provided with a light weight main structural frame comprising left side plate 6 and right side plate 7 which are connected by any suitable means, such as structural members 8, 9, 10 and 11. Side plates 6 and 7 may be decoratively covered by means of left side panel 12 and right side panel 13. As illustrated in FIGURES 4, 5a, and 24, panels 12 and 13 may be removably affixed to side plates 6 and 7 by means of rubber molding strips 14 and 15, spring clips 16 and screws 17. Exterior covering of the machine 1 is completed by front end plate 18, paper tray cover 19, top door 20, rear door 21 and rear cover plate 22.

Student and master answer sheets

Figure 51:
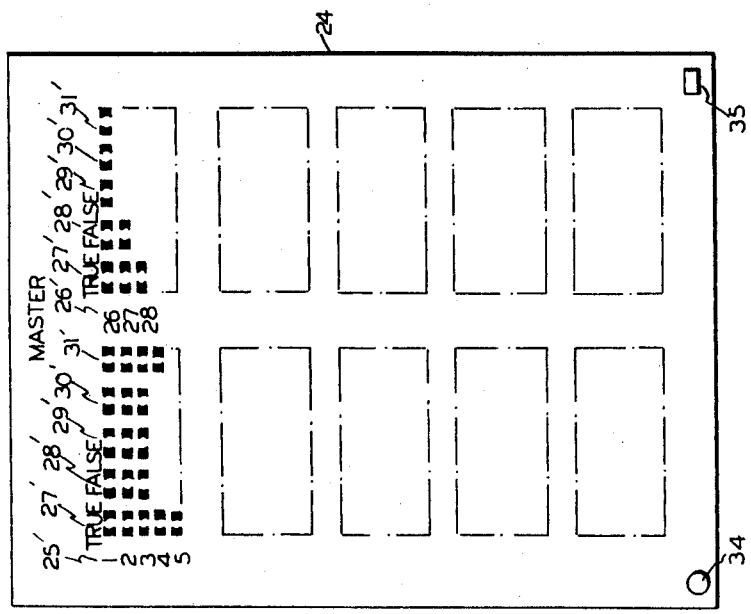
FIG. 51 is a view of the master sheet employed with the machine of the present invention.
Figure 50:
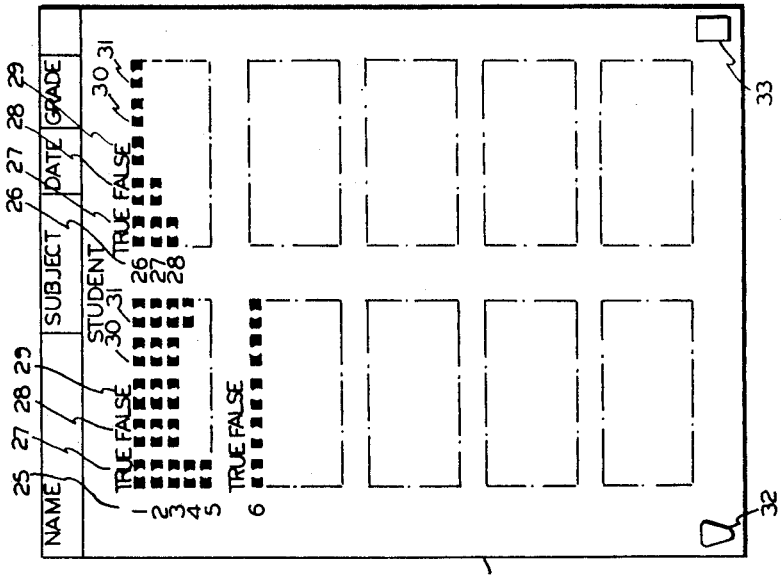
FIG. 50 is a view of a student sheet employed with the machine of the present invention.

Machine 1 is adapted to grade, mark and score the answers on a student sheet 23 in accordance with answers chosen by a teacher and placed upon master sheet 24. As seen in FIGURES 50 and 51, the printed markings on student sheet 23 and master sheet 24 are similar, each having two columns of numbers 25, 26 and 25', 26', respectively, corresponding to particular questions. Adjacent the right hand side of each number is a row of five answer spaces 27–31 and 27'–31', respectively, each of which is filled in at both sides by electrically conductive ink. The central portions of these spaces have no conductive ink and may be marked if desired with letters A–E or numbers 1–5 (not shown) corresponding to the possible answers of a multiple choice question. If a true and false type test is to be given, only spaces 27, 28 and 27', 28' need be used.

Student sheet 23 and master sheet 24 are provided at one end with a pair of sheet registering openings 32 and 33, and 34 and 35, respectively. A more complete description of the student sheet employed with the machine of the present invention may be had by referring to the co-pending application of Shaw et al., Ser. No. 268,813, filed Mar. 28, 1963.

General description

A brief description will first be given of the general operation of the machine 1, whereafter each separate mechanism and its operation will be explained in greater detail.

First, the back door 21 is opened and the student sheet receiving tray 36 is unfolded, as shown in FIGURE 2. A totalizing counter 37 inside the machine is re-set to zero by depressing the button 38, located on top door 20. A stack 3 of student answer sheets 23 are then placed face up in paper tray 39, making sure that the registering openings 32 and 33 of each sheet are disposed toward the right rear and left rear of the machine, respectively. The paper tray cover 19, which carries portions of the student sheet feed mechanism, generally shown as 40 in FIGS. 1, 7, 12, 14, is elevated by lifting the feed mechanism lever 41 to permit the stack 3 to be slid forward beneath the tray cover 19 into abutting engagement with feed fingers 42 and 43. The cover 19 and feed mechanism 40 is then lowered onto the top of the stack 3.

Figure 34:
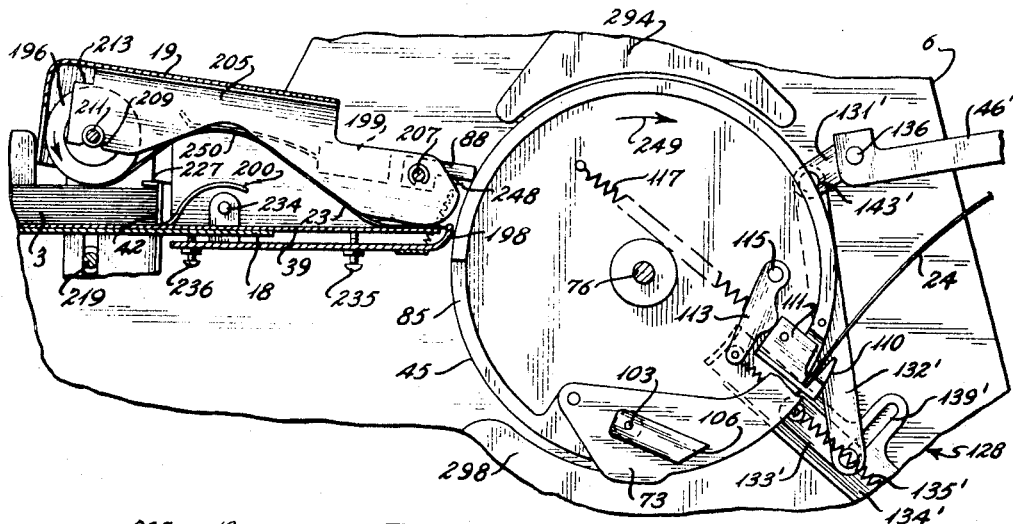
FIG. 34 is a view similar to FIG. 10, but showing a student sheet in position to be fed onto the master drum.

The "Master Install" button 44, located on top door 20, is depressed to rotate the master drum 45 into master sheet loading position shown generally in FIGURES 10, 11 and 34. The master release lever 46 (disposed adjacent rear door 21) is raised to the position 46' shown in FIGURES 11 and 34 to open master sheet clamping mechanism generally shown as 47. The master sheet 24 is then inserted into the master clamp mechanism 47, and positioned by master pins 48 and 49, which are adapted to be received in the master sheet registering openings 34 and 35, respectively. Thereafter lever 46 is lowered to close the clamping mechanism 47.

Figure 36:
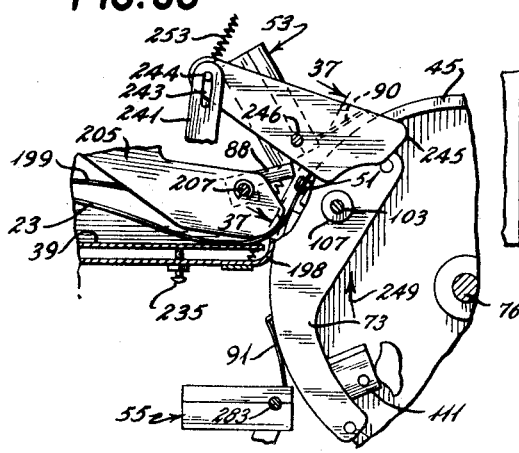
FIG. 36 is a fragmentary view showing the student sheet engaged by the student pins.
Figure 37:
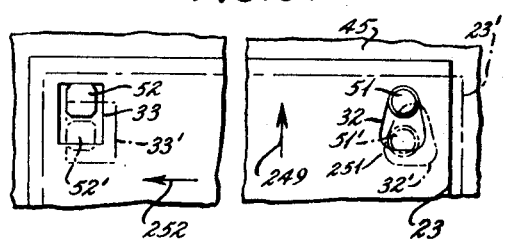
FIG. 37 is a fragmentary sectional view generally taken along line 37—37 in FIG. 36.
Figure 41:
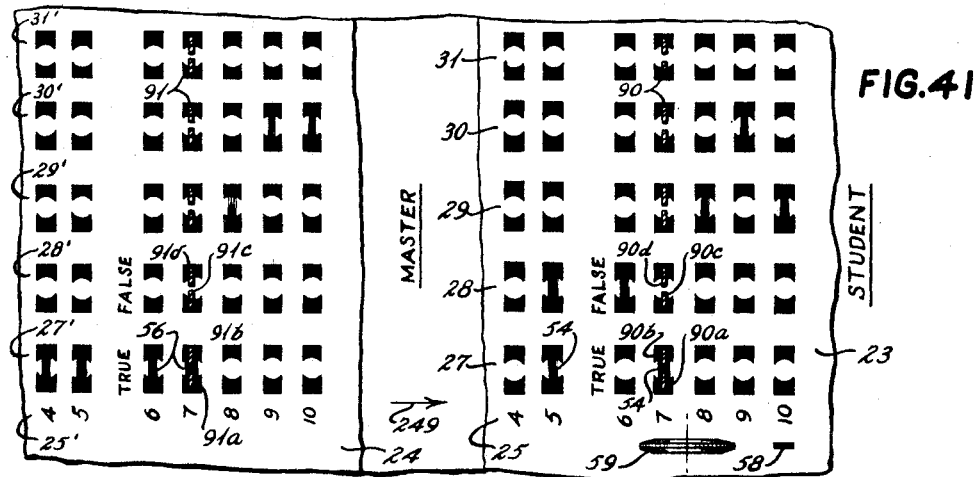
FIG. 41 is a fragmentary sectional view taken along line 41—41 in FIG. 40.

The "Grade" button 50, located on top door 20, is depressed to automatically wind the master sheet 24 onto the master drum 45 and commence the grading operation. For each rotation of master drum 45, a student sheet 23 is separated from stack 3 and fed by feed mechanism 40 onto the drum 45, in such a manner that student pins 51 and 52 are positioned within student sheet registering openings 32 and 33, respectively, as illustrated in FIGURES 36 and 37. As student sheet 23 is wound up on the master drum 45, student brush assembly, generally shown as 53, senses pencil marks 54 on the student answer sheet 23 and master brush assembly, generally shown as 55, senses pencil marks 56 on the master sheet 24, as illustrated in FIGURES 40 and 41. Each answer is compared within the student brush assembly 53 and the result obtained is fed to the electronics unit 57, shown schematically in FIGURE 53, and incorrect student answers marked, as at 58, by ink impregnated wheels 59 and 60 of marking solenoids 61 and 62 (see FIG. 10). The number of wrong answers are stored (1) in printing counter generally shown as 63 (which records the total number of incorrect student answers for each student sheet and is automatically re-set to zero before the next student sheet is graded), and (2) in totalizing counter 37 (which records the total number of incorrect student answers for all the student sheets 23 being graded and must be manually reset to zero by depressing button 38).

Figure 47:
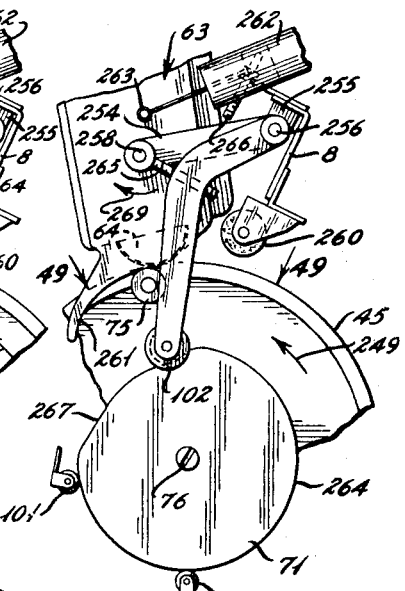
Figure 48:
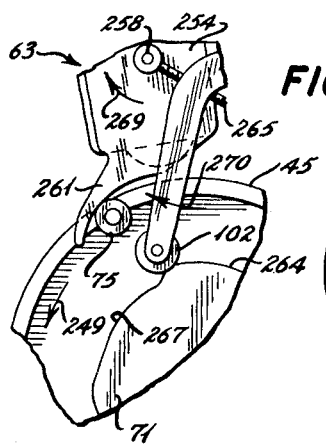
Figure 49:
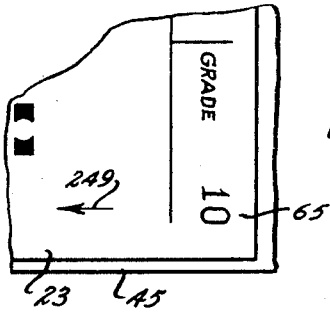
FIG. 49 is a fragmentary sectional view generally taken along line 49—49 in FIG. 47.

The total number of wrong answers for each student sheet 23 is printed by printing wheels 64 and 64' of printing counter mechanism 63 on the upper right hand side of each student sheet, as at 65 (FIGURES 47 and 49).

The scored student sheet 23 is removed from master drum 45 by student sheet stripper mechanism, generally shown as 66 (FIGURES 42–44), and deposited in sheet receiving tray 36.

The machine will proceed to grade one by one all of the student sheets in the stack 3 resting in the paper tray 39, unless one of the sheets is fed incorrectly, thereby causing master drum 45 and feeding mechanism 40 to automatically stop, as will hereinafter be described. After all student sheets have been graded the machine will automatically stop itself.

After all student sheets have been graded, the master sheet 24 may be removed from the machine. This is done by depressing "Master Remove" button 67, located on top door 20 to rotate drum 45 to the position shown in FIGURES 10, 11 and 34. Master release lever 46 is then raised to open master sheet clamping mechanism 47. Upon manual removal of the master sheet 24 from the clamping mechanism 47, the leading edge of the sheet is placed on top of receiving tray 36. After lowering lever 46, the "Clear" button 68, located on top door 20, is depressed and held down momentarily to permit master drum 45 to automatically unwind the master sheet 24 into tray 36. Upon release of the "Clear" button 68, the master drum 45 will stop.

The grading cycle has now been completed. Depressing the "off" button 69, located on top door 20, turns the machine off. Last the stack of graded test sheets are removed from receiving tray 36 and back door 21 is closed.

Master drum assembly

The master drum assembly, generally shown as 70 in FIG. 16, includes master drum 45, master sheet clamping mechanism 47, plate cam 71, secondary gate cams 72 and 73, student pin assembly 74, and printing counter cam follower 75. Master drum 45 and plate cam 71 are suitably mounted on, for rotation with, shaft 76, which is suitably journalled in side plates 6 and 7 and rotatably driven by drum motor 77 (FIGURE 7) through the gears 78 and 79 (FIGURE 8).

Referring now to FIGURES 16 and 17 it will be seen that master drum 45 is cut away at 80 to receive the clamping mechanism 47. As shown in FIGURES 16 and 18 master drum 45 is also cut out at 81 and 82 to receive student pin supporting blocks 83 and 84, respectively, and at 85 and 86 to receive secondary gate members 87 and 88 (FIGURES 32 and 33).

As best seen in FIGURES 16, 18 and 20, a shroud 89 formed from a sheet of a suitable plastic material, such as Mylar, is adapted to overlie the surface of master drum 45 serves to insulate the drum and also to prevent wearing engagement with brushes 90 and 91 of the student and master brush sensing assemblies 53 and 55, respectively. Shroud sheet 89 is provided at one end with projections 92 and 93 having suitably formed holes 94. Any suitable means may be employed to affix sheet 89 to drum 45 such as a clamping bar 95 and screws 96 (only one illustrated).

Secondary gate cams 72 and 73 are identical in design and may be affixed to the sides of master drum 45 by any suitable means such as spacer elements 97 and screws 98. As will be described more fully below, the cams 72 and 73 are adapted to coact with secondary gates 87 and 88, respectively. Cam 73 is adapted also to actuate load position switch 99 (FIGURES 9 and 52).

As will hereinafter be described, cut out portions 85, 86 and gate cams 72, 73 respectively, function as first and second drum position indicating means and control the stepwise application of each student sheet 23 onto the surface of master drum 45.

Plate cam 71, as will be more fully described below, is adapted to actuate drive motor switch 100 and jam check and counter reset switch 101 (FIGURES 11 and 52) and actuate cam follower 102 of printing counter mechanism 63 (FIGURES 11 and 45–48).

Student pin assembly

The student pin assembly, generally shown as 74 in FIGURE 16, is supported by means of shaft 103, which is rotatably supported by master drum 45 and is journalled within openings 104 and 105 provided in secondary gate cams 72 and 73, respectively. Student pin support blocks 83 and 84 and student pin cam 106 are suitably affixed to, for motion with, shaft 103, and a student brush cam follower 107 is rotatably affixed to shaft 103. As seen in FIGURES 10, 19 and 39, springs 108 and 108' act to normally bias student pin supporting blocks 83 and 84 into contact with wall surfaces 109 and 110 in master drum cutout portions 81 and 82, respectively. In this position, student pins 51 and 52 are properly disposed to be received within registering openings 32 and 33 of a student sheet 23. As will hereinafter be more fully described, student pins 51 and 52 are adapted to be pivoted backwardly in order to remove the pins from registering openings 32 and 33 of student sheet 23, as the sheet is removed from the master drum by the stripping mechanism 66 (FIGURES 42 and 43). If desired, pins 51 and 52 may be pivoted to a position beneath the surface of master drum 45 to remove all outwardly extending projections from the master drum surface which might interfere with the stripping of sheet 23.

Master sheet clamping mechanism

The master sheet clamping mechanism, generally shown as 47 in FIGS. 16 and 18–21, comprises a generally L-shaped clamping bar 110, which is suitably affixed for motion with reciprocating plates 111 and 112, and a pair of bar lifting cams 113 and 114. Cams 113 and 14 are affixed to, for rotation with, a shaft 115, which is journalled in master drum 45. Bar 110 is normally biased to master sheet clamping position by means of spring 116 and 117, and cams 113 and 114 are normally biased into engagement with surfaces 118 and 119 of plates 111 and 112, respectively, by means of spring 120 (FIG. 16).

It will be noted that clamping bar 110 is provided with slot openings 121 and 122 to receive projections 92 and 93 of shroud sheet 89, thus permitting raising and lowering of bar 110 without movement of sheet 98. Also, bar 110 is provided with cutout portions 123 and 124 to receive master pins 48 and 49, which are permanently affixed to master drum 45.

A laterally projecting pin 125, carried by the free swinging end 126 of cam 114, is provided to facilitate removal of a master sheet 24 from positioning engagement with master pins 48 and 49, and clamping engagement with bar 110. As seen in FIGURE 19, elevation of pin 125 by flange member 127, which is associated with the master release mechanism 128, to the position indicated in phantom 125', acts to pivot cams 113 and 114 about the axis of shaft 115. Such motion of the cams 113 and 114, which are engagement with surfaces 118 and 119 of plates 111 and 112, acts to force bar 110 upwardly to an open position, as indicated in phantom, against the spring force of springs 116 and 117. When pin 125 is released from engagement with member 127, springs 116 and 117 will automatically return bar 110 and cams 113 and 114 to normal master clamping position. It will be noted that when bar 110 is forced to an open position, beveled surfaces 129 and 130 of plates 111 and 112, respectively, act on the under surface of a master sheet 24, so as to remove the sheet from engagement with master pins 48 and 49 in order to facilitate removal of the master sheet from master drum 45.

Master sheet release mechanism

The master sheet release mechanism, generally shown as 128 in FIGURE 23, is disposed on the left side of the machine 1, between master drum 45 and side plate 6. The mechanism 128, generally comprises master release lever 46, pivotable linkage arms 131, 132 and 133; slide plate 134; and slide plate return spring 135. As best seen in FIGURES 11 and 23, lever 46 may be formed integrally with linkage arm 131, and is suitably journalled for rotation on the student sheet stripper mechanism supporting shaft 136, which in turn is suitably supported by side plates 6 and 7. Slide plate 134 is provided with a pair of longitudinally extending, slot openings 137 and 138, and a laterally extending slot opening 139, which extends into the laterally projecting flange 140 of slide plate 134. Slide plate 134 is affixed to side plate 6 for reciprocating motion radially of master drum supporting shaft 76, by means of a pair of pins 141 and 142, which are slidably received within slot openings 137 and 138, respectively. Pin 141 performs the additional functions of rotatably supporting linkage arm 133 and mounting one end of slide plate spring 135. Suitable pins 143 and 144 are provided to pivotally connect linkage arm 132 at its respective ends to linkage arms 131 and 133.

Pin 144 is adapted to be received for reciprocating motion within slot opening 139, as pin 144 moves along an arc about pin 141, in such a manner as to reciprocate slide plate 134. The radially inwardly projecting end of slide plate 134 is provided with at laterally extending, integrally formed, curved flange member 127. As explained above, member 127 is of sufficient length to overlie the laterally projecting outer end of pin 125, which is supported on master bar lifting cam 114.

The mechanism 128, as shown in solid lines in FIGURE 11, is in non-operating position. In this position, member 127 is disposed radially inwardly of pin 125, thereby permitting master drum 45 to rotate freely without accidentally opening master clamping mechanism 47. Primed numbers are employed in FIGURES 11 and 34 to illustrate the relative positioning of the several components of releasing mechanism 128 after lever 46 has been raised to position 46' in order to move pin 125 to position 125', when master drum 45 has been moved to proper position by either "Master Install" button 44 or "Master Remove" button 67.

It is desirable that means be provided to lock mechanism 128 in open position, as illustrated in phantom in FIG. 11, in order to free both hands of an operator during installation or removal of a master sheet. Locking of mechanism 128 is accomplished by extending slot 139, as at 145, to permit pin 144, when sliding downwardly within slot 139, to cross over the axis of spring 135. Accordingly, the restoring force of spring 135 will tend to maintain pin 144' seated in portion 145 of slot 139, rather than move pin 144' upwardly within slot 139.

To prevent damage to mechanism 128, should an operator rotate master drum 45 without lowering lever 46', flange member 127 is provided with a beveled surface 146 to permit pin 125' to slide off of member 127 and be returned to normal clamping position 125 by means of springs 116 and 117.

Student sheet stripper and pin depressing mechanism

The student sheet stripper and pin depressing mechanism, generally indicated as 66, is chiefly shown in FIGS. 22 and 40–44. Mechanism 66 comprises cylindrical platen 147, which is disposed for rotatable frictional engagement with the surface of master drum 45, and stripper plate mechanism 148. Both platen 147 and mechanism 148 are journalled for independent rotation upon supporting shaft 136, which is in turn supported in any suitable manner by side plates 6 and 7. Platen 147 is formed with a resilient outer face and provided with an annular groove 149 intermediate its end portion 150 and 151. The purpose of platen 147 is to maintain accurate registration of a student sheet 23 with respect to the surface of master drum 45, as student pins 51 and 52 are extracted from registering openings 32 and 33 in the student sheet and the leading edge of the sheet is stripped from the drum.

Plate mechanism 148 comprises a stripper plate 152, which is provided with a sharp leading edge portion 153, and integrally formed side flange members 154 and 155 which act to support the mechanism on shaft 136. A laterally extending flange member 156 is suitably affixed to, or may be formed integrally with, flange member 155. Cam follower 157 is rotatably supported on the free swinging end of flange 156 by any suitable means such as pin 158. Leading edge portion 153 is normally biased into slight interference engagement with shroud sheet 89 carried on the surface of master drum 45 by spring 159, as best seen in FIGURE 9. If desired, however, spring 159 may be dispensed with and the weight of plate mechanism 148, which is pivotable with respect to supporting shaft 136, employed to bias leading edge portion 153 against the surface of drum 45.

When drum 45 has been rotated to the position shown approximately in FIGURE 42, so as to place the leading edge of student sheet 23 between drum 45 and platen 147, cam follower 157 is adapted to coact with student pin cam 106 to pivot student pins 51 and 52 in a direction indicated by arrow 160 backwardly to a position beneath the surface of drum 45, thus removing the student pins from registry openings 32 and 33 in sheet 23. Simultaneously therewith, cam follower 157 and cam 106 serve to pivot stripper edge portion 153 in a direction indicated by arrow 161 (FIG. 42) into a relatively close interference relationship with the shroud sheet 89, so as to effect removal therefrom of student sheet 23. Upon further rotation of drum 45 in the direction of arrow 162, cam follower 157 passes out of engagement with cam 106, thereby permitting springs 108 and 108' to return student pins 51 and 52 into their normal projecting positions, and edge portion 153 to return to a position of relatively slight interference engagement with Mylar sheet 89 carried on the surface of drum 45, as determined by spring 159. As drum 45 continues to rotate the student sheet passes out to sheet receiving tray 36 as shown in FIG. 44.

Sheet receiving tray

The sheet receiving tray, generally shown as 36 (see FIGURES 2, 5, 5a, and 8) comprises a back door 21 and sheet receiving extension 163. Brackets 164 and 165, and a pair of generally U-shaped brackets 166 and 167 are suitably affixed, as by welding, to the inner surface of back door 21 on either side thereof, as shown generally in FIG. 2. Brackets 164 and 165 are provided with a plurality of normally extending, integrally formed flange portions 168, 169 and 170 and 171. Sheet receiving extension 163 is provided with flange portions 172, 173 and 174 which coact with flange portions 168 and 170 to define the three side walls of tray 36. Suitable pins or rivets 175 and 176, which pass respectively through flange portions 168 and 172, and 170 and 173, are provided to pivotably attach extension 163 to back door 21.

Back door 21 is pivotably and slidably affixed to machine side plates 6 and 7 by any suitable means, such as pins 177 and 178, which are journalled in U-shaped brackets 166 and 167. Side plates 6 and 7 are provided with slots 179 and 180, which are adapted to slidably receive outwardly projecting ends 181 and 182 of pins 177 and 178, respectively. The back door 21 and sheet receiving tray 36 are supported in lowered position by a pair of linkage arms 183 and 184, which are formed of pairs of members 185 and 186, and 187 and 188, respectively. The members of each pair are pivoted with respect to each other by pins 189 and 190. Linkage members 185 and 187 are pivotably connected to flange portions 171 and 169, respectively, by pins 191 and 192, and members 186 and 188 are pivotably connected to side plates 6 and 7, respectively, by any suitable means such as pins 193 and 194.

To dispose tray 36 in sheet receiving position, as shown in FIG. 2, an operator places his finger in depression 195, formed in back door 21, and pulls the back door 21 to open position as seen in FIG. 5. Extension 163 is then pivoted with respect to back door 21 about pins 175 and 176 to full line position shown in FIG. 5.

Paper feed mechanism

The paper feed mechanism, generally shown as 40 in FIGS. 7, 12, 13 and 14, is adapted to strip ungraded student sheets 23 from the top of a stack of such sheets 3, placed in paper tray 39, and feed these sheets one at a time onto master drum 45 in registering engagement with student pins 51 and 52. The feed mechanism 40 generally comprises paper tray cover 19, cover lift lever 41, fed wheels 196 and 197, feed fingers 42 and 43, primary gate 198, secondary gates 87 and 88, loop sensing switch 199, feed pump 200, feed motor 201, O-ring drive belt 202, and pin clutch 203. If desired a non-flexible drive belt or chain in combination with a suitable takeup may be substituted for O ring belt 202.

Sheet feed guides 204, 205 and 206 are suitably affixed to the under surface of cover 19, as by welding, and act to pivotally support cover 19 with respect to secondary gate shift 207, which is affixed at either end to side plates 6 and 7. The forwardly extending ends of guides 204, 205 and 206 are cut out as at 208, 209 and 210 to rotatably receive feed wheel drive shaft 211 (see FIGS. 7, 14). Shaft 211 is removably affixed for rotation with respect to the cover 19 by means of a generally U-shaped spring clip 212, which is adapted to be received in cut out portion 213, of guide 205 (FIGS. 10 and 14). Shaft 211 adapted to be powered by feed motor 201 through O ring drive belt 202, pulley 214, which is supported on for rotation with respect to shaft 211, and pin clutch members 215 and 216. It will be specifically noted that pin 215, which is carried on pulley 214, and pin 216, which is carried on shaft 211, permit relative rotation between pulley 214 and the shaft 211 and accompanying feed wheels 196 and 197. Thus, when the sheet 23 is drawn up on master drum 45, as will more fully hereinafter be described, wheels 196 and 197 are permitted to rotate with a peripheral speed greater than that normally caused by driving engagement with pulley 214, so as to prevent excess tension in sheet 23.

Referring to FIGURES 12 and 14 it will be seen that feed finger brackets 217 and 218 are rotatably supported at their upper ends by drive shaft 211, and slidably supported at their lower ends by stationary shaft 219. Shaft 219 is affixed at its ends by any suitable means to side plates 6 and 7 and adapted to pass through slot openings 220 and 221 of brackets 217 and 218, respectively. In order to permit vertical movement of brackets 217 and 218, when lever 41 is employed to lift tray cover 19 and thus shaft 211 (as shown in FIG. 9), paper tray 39 is cut out at 222 and 223, and front end plate 18 is cut out at 224 and 225. Feed fingers 42 and 43, which are formed integrally with brackets 217 and 218, are provided with lip portions 226 and 227, which are adapted to overlie the corners of the student sheet 23 on top of stack 3, as shown in FIGURE 13. As shown generally in FIGURE 26, lip portions 226 and 227 act to strip sheet 23 from pile 3 upon feeding rotation of wheels 196 and 197. Feed fingers 42 and 43 and their operation in feeding single sheets of a stack are more completely described in the patent to Tonkin 2,912,241.

As best seen in FIGURES 13 and 14, cover lift lever 41 is pivotally affixed to side plate 7 by any suitable means, such as pin 237, and is provided with laterally extending flange member 238, which is adapted to underlie side portion 239 of tray cover 19 and coact therewith to raise the tray cover. The rearwardly extending portion 240 of lever 41 is pivotally affixed to the lower end of linkage arm 241 by any suitable means, such as pin 242. Arm 241 is provided at its upper end with slot 243, which is adapted to slidably receive pin shaft 244. Pin shaft 244 is carried on the forwardly extending end of student brush cam 245. It will be noted that student brush cam 245 and student brush assembly 53 are suitably affixed to and for rotation with student brush shaft 246, which in turn is suitably journalled at its ends in side plates 6 and 7. Accordingly, as seen in FIG. 9, when lever 41 is elevated it performe the dual functions of (1) pivoting tray cover 19 and depending elements of the paper feed mechanism 40 which are mounted upon shaft 211, upwardly about secondary gate shaft 207, and (2) pivots student brush cam 245 about the axis of student brush shaft 246 in order to move student brush elements 90 away from the surface of master drum 45. Thus, it will be evident that should a student sheet 23 become jammed after passing beneath student brushes 90, an operator, by lifting lever 41, may raise both feed wheels 196 and 197 and student brushes 90 out of contact with sheet 23 to permit easy withdrawal thereof from the front end of the machine.

As shown in FIGURES 10 and 13, the primary gate 198 is provided with a pair of integrally formed upstanding flange portions 228 and 229, which are adapted to extend upwardly through slot openings 230 and 231 of front plate 18, and a laterally extending bracket 232. Primary gate 198 may be pivotally affixed to plate 18 by any suitable means such as bracket 233 and shaft 234. Any suitable means, such as adjusting screws 235 and 236, may be employed to limit the pivotable movement of gate 198.

As will be seen by referring to FIGS. 27–33, secondary gates 87 and 88 are journalled on gate shaft 207, and operably connected with the primary gate 198, through springs 247 and 248, and bracket 232. In FIGS. 27, 31 and 34, secondary gates 87 and 88 are shown to be riding on the surface of master drum 45. In this position the tension in springs 247 and 248 act to maintain the leading edge of primary gate 198 elevated above the end of paper tray 39 in order to impede forward progress of a student sheet 23 fed toward drum 45 by feed wheels 196 and 197. The maximum elevation of the leading edge of primary gate 198 above the surface of paper tray 39 is determined by adjusting screw 235.

Upon continued rotation of master drum 45 in the direction indicated by arrow 249, secondary gates 86 and 87 are adapted to slide off of the surface of drum 45 and be received within cut out portions 85 and 86, thereby permitting the leading edge of primary gate 198 to fall, under the influence of gravity, below the surface of paper tray 39 an amount determined by adjusting screw 236. At this point the fully collapsed springs 247 and 248 act to support secondary gates 86 and 87 in proper position to impede the leading edge of student sheet 23, which has moved forward into contact with the surface of drum 45 upon lowering of primary gate 198, due to the unstable condition of sheet 23 caused by loop 250 (See FIG. 35).

Upon further rotation of drum 45 in the direction of arrow 249, as seen in FIGURES 30, 33 and 36, secondary gate cams 72 and 73 are brought into position to elevate secondary gates 86 and 87 above the surface of master drum 45, so as to free the leading edge of student sheet 23. As illustrated in FIGURE 36, simultaneously with the elevation of secondary gates above the surface of drum 45 by cams 72 and 73, student pins 51' and 52' are positioned within registry openings 32' and 33' of sheet 23' (see FIG. 37). Further rotation of drum 45 in the direction indicated by arrow 249, causes student pins 51' and 52' to move within registering openings 32' and 33' towards the leading edge of sheet 23' to the position indicated as 51 and 52. In the particular instance shown in FIGURE 37, student sheet 23' has not been fed into perfect longitudinal registration with student pins 51' and 52'. Thus, it will be seen that motion of pin 51' upwardly along the edge 251 of registering opening 32' acts to gradually translate student sheet 23' in a direction indicated by arrow 252 to effect proper positioning of the student sheet on the surface of drum 45. It will of course be obvious that the student pins will effect proper registration of student sheet 23 irrespectfully of whether such sheet is initially offset to the right or left of drum 45.

On further rotation of master drum 45 in the direction of arrow 249, secondary gates 86 and 87 will ride off of cams 72 and 73 and assume their initial relative position to primary gate 198, as indicated in FIGURE 27.

Referring now primarily to FIGURES 38 and 39, it will be seen that as the leading edge of sheet 23, carried and positioned by student pins 51 and 52, approaches student brushes 90, cam follower 107 coacts with student brush cam 245 to pivot brushes 90 upwardly away from the surface of master drum 45, so as to permit unobstructed passage of student sheet 23. Referring to FIGURE 38, it will be appreciated that such pivotable motion of student brush cam 245, does not in any way interfere with or cause motion of lift lever 41, which is connected thereto by linkage arm 241, inasmuch as connecting pin shaft 244 may slide downwardly within slot 243. Upon continued rotation of master drum 45 in the direction of arrow 249, the cam follower 107 will pass out of engagement with student brush cam 245, permitting spring 253 to return brushes 90 to their initial position, as generally shown in solid lines in FIGURE 9.

Printing counter mechanism

As discussed above, the printing counter mechanism 63 is employed to print the total number of wrong answers on a corrected student sheet as at 65 (FIG. 49), as determined by electronic comparison of answer marks 54, appearing on a student sheet 23, with answer marks 56, appearing on master sheet 24.

Printing counter mechanism 63, as best seen in FIGS. 10 and 12, is pivotally mounted on supporting member 8 by means of generally U-shaped yoke 254, bracket 255, pin shaft 256, and pins 257 and 258. Counter 63 comprises a conventional solenoid operated printing mechanism 259 having numbered printing wheels 64 and 64', a permanent inking roller 260, cam follower 102, printing cam 261, and air dash pot 262, which is affixed to printing mechanism 259 by pin 263.

Figure 45:
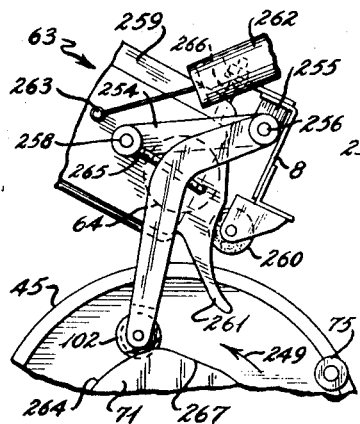
FIGS. 45, 46, 47 and 48 are sectional views generally taken along line 45—45 in FIG. 3; and showing sequential steps in the motion of the printing counter mechanism.

The compound motion undergone by printing mechanism 259 is generally illustrated in FIGURES 45 through 48. FIGURE 45 illustrates printing mechanism 259 in rest position. In this position, cam follower 102 is adapted to ride on the circular peripheral portion 264 of plate cam 71. Mechanism 259 is restrained from motion about either the axes of pins 257, 258, or about the axis of pin shaft 256 by means of an adjustment screw 265, carried by cam follower 102, and by an adjustment screw 266, carried by supporting member 8, respectively.

Figure 46:
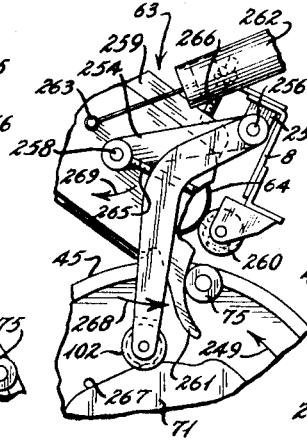

Upon rotation of master drum 45 in the direction indicated by arrow 249, the printing mechanism 259 is moved to printing wheel inking position, illustrated in FIGURE 46. In reaching this position, cam follower 102 rolls into the depression 267 of the periphery of cam plate 71, thereby permitting pivotal motion of cam follower 102 about the axis of pin shaft 256 in a direction indicated by arrow 268, in such a manner as to lower printing wheels 64 and 64' into surface contact with permanent inking roller 260. Still referring to FIGURE 46, it will be seen that at this point printing counter cam follower 75 cooperates with printing cam 261 to pivot printing mechanism 259 about the axis of pins 257, 258, thereby causing the surfaces of printing wheels 64 and 64' to move relative to inking roller 260.

FIGURE 47 illustrates the position of the printing mechanism 259 at the moment that markers 64 and/or 64' imprint the total number of wrong answers 65 on the student sheet 24, as seen in FIGURE 49.

It is desirable to prevent printing mechanism 259 from retracing its compound motion, as shown generally in FIGURES 45 through 47, subsequent to the disengagement of cam follower 75 with cam 261, which would ordinarily result in a second number 65 being printed upon the surface of drum 45, and could result in possible injury to the mechanism, because during such return motion, printing wheels 64 and 64' would be moving in an opposite direction relative to master drum 45. This is achieved in the present invention in a manner suggested in FIGURE 48, whereby cam follower 102 is adapted to move out of depression 267 onto the circular portion 264 of the cam plate 71, thereby pivoting cam follower 102 backwardly in the direction indicated by arrow 270 in such a manner as to raise pivotable axis 257, 258, to the position indicated in FIGURE 45, prior to disengagement of cam follower 75 with cam 261. During this motion, dash pot 262 acts to retard the pivotal motion of printing mechanism 259 to prevent damage thereto.

Student test sheet feeding operation

To feed student test sheets 23 into the grading machine 1, a stack of student sheets 3 are placed on the tray 39 in such a manner that the registering openings 32 and 33 are disposed toward the feed mechanism 40 and the printed surface of each sheet is up. The tray cover 19 is then elevated by means of the cover lift lever 41 and the sheets inserted between the tray 39 and cover 19 until they abut the feed fingers 42 and 43. When the lift lever 41 is released and the tray cover 19 is lowered by gravity, the lip portions 226 and 227 of separator elements 42 and 43 will overlie the top sheet in the stack 3 at the forwardly extending corners thereof and the feed wheels 196 and 197 will be placed in frictional driving engagement with the top sheet. If desired, a spring 19', resiliently connecting cover 19 with member 8, may be provided to vary the force with which wheels 196 and 197 bear on the top sheet (see FIG. 7). Power is then supplied to the sheet feed motor 201 through the loop sensing switch 199 by depressing the "Grade" button 50. Upon actuation, the feed motor 201 is adapted to drive the feed wheels 196 and 197 (see FIGS. 10, 26) through the O-ring belt drive 202 and the pin clutch 203. Rotation of the feed wheels 197 and 196 frictionally forces the uppermost sheet forward to effect separation of the sheet from the stack 3 by buckling the forward corners thereof against and over the lip portions 226 and 227 of the separator elements 42 and 43. After separation the top sheet rides over the lip portions and continues forward toward the master drum 45 until its leading edge abuts against the primary gate 198, at which point its forward progress is inhibited. Upon continuous driving rotation of the wheels 196 and 197, the sheet 23 is caused to buckle upwardly to form a loop 250 between the primary gate 198 and the wheels 196 and 197, as shown in FIG. 34. Formation of loop 250 actuates the loop sensing switch 199 which cuts off power to the feed motor 201. To ensure proper loop formation, an upwardly projecting bump 200, disposed at the floor of the tray 39, acts to create an unstable condition in the fed sheet in an upper direction.

Figure 35:
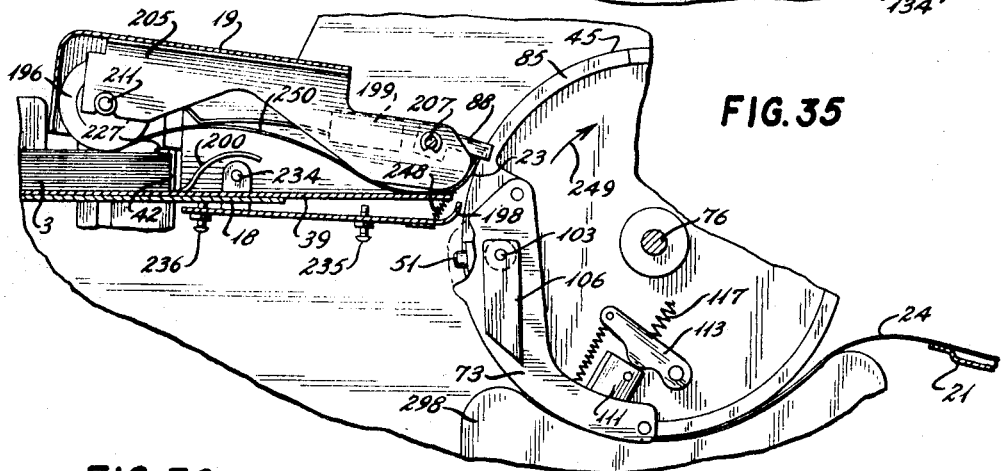
FIG. 35 is a view similar to FIG. 34, but showing a student sheet in contact with the master drum.

The thus disposed sheet 23 is then maintained in a rest or dormant condition by now stationary feed wheels 196 and 197 and primary gate 198 until master drum 45 rotates into proper position for receiving the sheet 23. At this time, the secondary gates 87 and 88 fall by gravity into the recesses 85 and 86 on either side of the master drum 45, thereupon permitting the primary gate 198, which is attached to the secondary gates 87 and 88 by spring links 247 and 248, to drop below the edge of the tray 39, thereby freeing the leading edge of the sheet 23. Due to the loop 250, sheet 23 is unstable in a direction toward the surface of drum 45. Accordingly, when as shown in FIG. 35 the primary gate 198 is depressed the leading edge of the sheet 23 moves forwardly until it comes in contact with the now lowered secondary gates 87 and 88, where further progress of the sheet is once again inhibited. Such motion of sheet 23 does not decrease the height of loop 250 sufficiently to actuate loop sensing switch 199.

As the master drum 45 continues to rotate to the position shown in FIG. 36, the student pins 51 and 52, which protrude from the surfaces thereof, move into registration with the respective registering openings 32 and 33 in the student sheet 23. At the same time, the cams 72 and 73, located on the sides of the master drum 45, force the secondary gates 87 and 88 outwardly from the surface of master drum 45 and away from the leading edge of the sheet 23, in order to free the sheet and permit the student pins 51 and 52 to properly orient the sheet with respect to the surface of master drum 45, as illustrated in FIG. 37, and draw the sheet onto the surface of the drum. This forward motion of the leading edge of student sheet 23 reduces the height of loop 250, whereby actuating loop sensing switch 199, which energizes motor 201.

Inasmuch as feed motor 201 is not actuated until sheet 23 has started to be drawn onto drum 45, the leading edge of sheet 23 is permitted to be accurately engaged by student pins 51 and 52, without the trailing edge portion thereof being driven by wheels 196 and 197, which circumstance might cause instability in the sheet and thus improper sheet registrations.

Further, it will be appreciated that in the preferred embodiment of the present invention the feed wheels 196 and 197 are not positively driven by feed motor 201 (being driven via pin clutch 203), during the withdrawal of the trailing edge of sheet 23 from between the wheels and stack 3, even though motor 201 is energized during such withdrawal. Rather, drum 45 is adapted to rotate at a sufficiently high peripheral speed to effect withdrawal of the trailing edge from beneath the wheels 196 and 197, in such a manner as to cause the wheels to rotate at a peripheral speed slightly in excess of their positively driven peripheral speed, thus disengaging pin clutch 203. If pin clutch 203 were eliminated, drum motor 77 and feed motor 201 would have to be synchronized, in such a manner as to cause drum 45 and wheels 196 and 197 to rotate at the same peripheral speed. Without pin clutch 203, a relatively higher drum peripheral speed would cause sheet 23 to be subjected to unduly high tension between the drum and the wheels, which might result in tearing of the sheets. Conversely, a relatively lower drum peripheral speed might result in a loop 250 being formed in the fed sheet at an abnormal portion of the drum rotational cycle. In addition to alleviating the necessity of synchronizing motors 77 and 201, pin clutch 203 permits the use of a single switch, i.e. loop switch 199, to control feed motor 201, since it will be readily seen that without synchronization and without pin clutch 203, a second switch would have to be employed to energize feed motor 201 at the point in time after the trailing edge of sheet 23 passes from beneath feed wheels 196 and 197.

After the trailing edge of sheet 23 is withdrawn from beneath wheels 196 and 197, the pin clutch 203 will once again become engaged to drive the wheels, thereby effecting separation and forward feeding of the newly exposed sheet 23 of stack 3. The motor 201 will continue to drive feed wheels 196 and 197, until the thus exposed sheet is in turn buckled to form loop 250, which once again activates loop sensing switch 199.

Jam sensing operation

The machine of the present invention is adapted to determine when a studen answer sheet 23 has been improperly fed or for some reason has become jammed in the machine. To sense a jam or potential jam, a relationship is established between student sheet 23 being fed into the machine 1 and the rotatable position of master drum 45 by means of a series of microswitches, i.e. loop sensing switch 199 (FIGS. 34 and 52), motor drive switch 100 and jam check switch 101 (FIGS. 11 and 52) and plate cam 71 (FIGS. 11 and 52).

The loop sensing switch 199 acts to determine the presence or absence of a formed loop 250 of student sheet 23 in the feeding mechanism. Drive motor switch 100 and jam check switch 101, which are acutated by the depression 267 in plate cam 71, are employed to determine the position of the student pins 51 and 52 on the rotating master drum 45 relative to the paper tray 39, i.e. the student pins are approaching the transfer point (FIG. 35) or the student pins have passed the transfer point (FIG. 36).

As more comprehensively described, infra., electrical signals representing the presence or absence of the paper loop 250 and the relative position of the student pins 51 and 52 are transmitted to the programming section of electronics unit 57, shown schematically in FIG. 54, where the signals are evaluated as follows:

(1) Student pins 51 and 52 approaching the paper tray 39. At this portion of drum rotation it is normal for the loop sensing switch 199 to be actuated by the presence of loop 250. Absence of loop 250 indicates that there are no more student sheets 23 in paper tray 39 or that a student sheet 23 has not been fed off of stack 3.

(2) Student pins moving away from the paper tray. During this portion of drum rotation the absence of loop 250 is normal. If a loop 250 is sensed when the student pins 51 and 52 are moving away from the paper tray 29 an abnormal condition exists, i.e. the student pins 51 and 52 have missed sheet 23 or the previously fed sheet 23 has become jammed in the machine.

Figure 54:
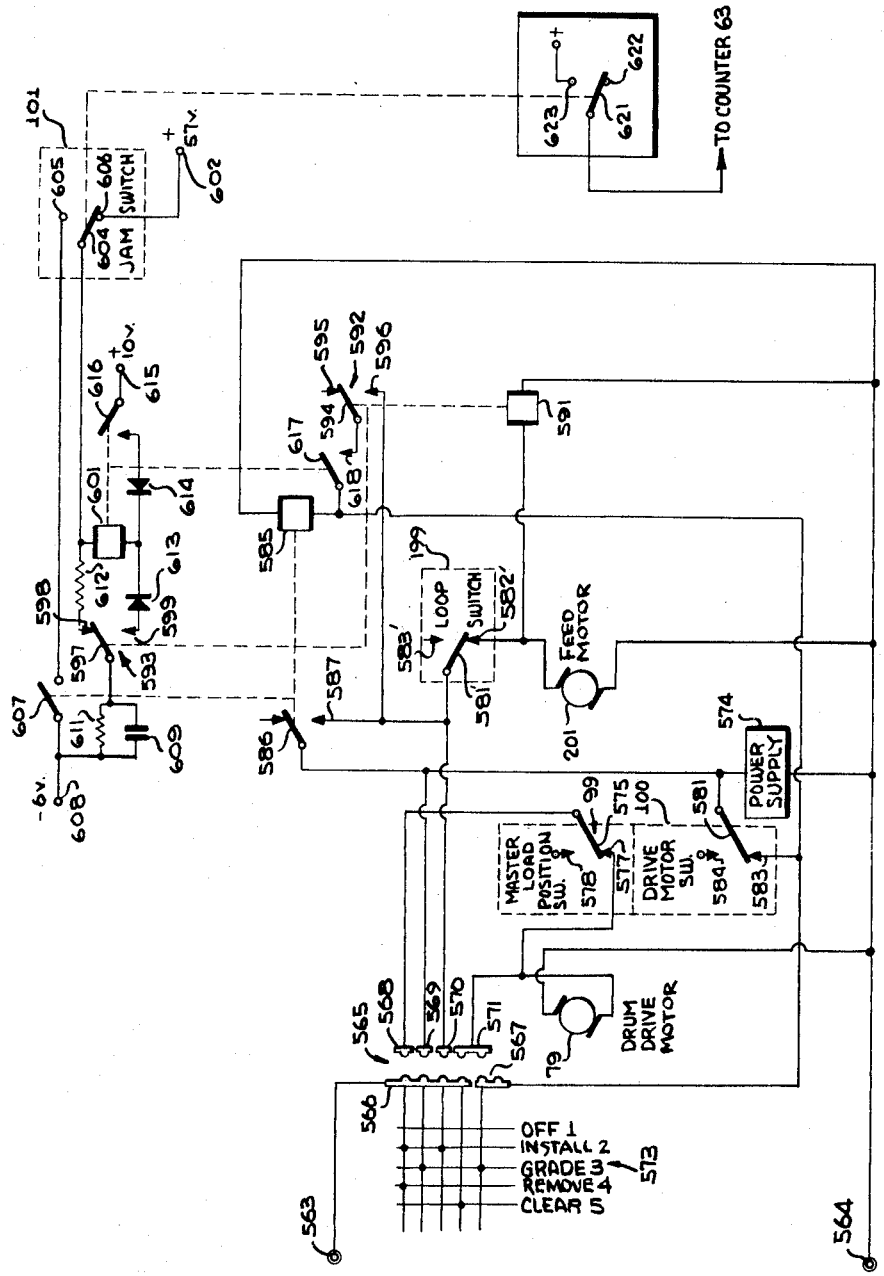
FIG. 54 is a circuit diagram of the control circuitry for the drum and paper feed motors.

When an abnormal condition as set forth above exists, the programming section of the electronics unit 57, shown schematically in FIGURE 54, turns off the power for the drum drive motor 77 and the feed motor 201.

Grading section

Figure 53:
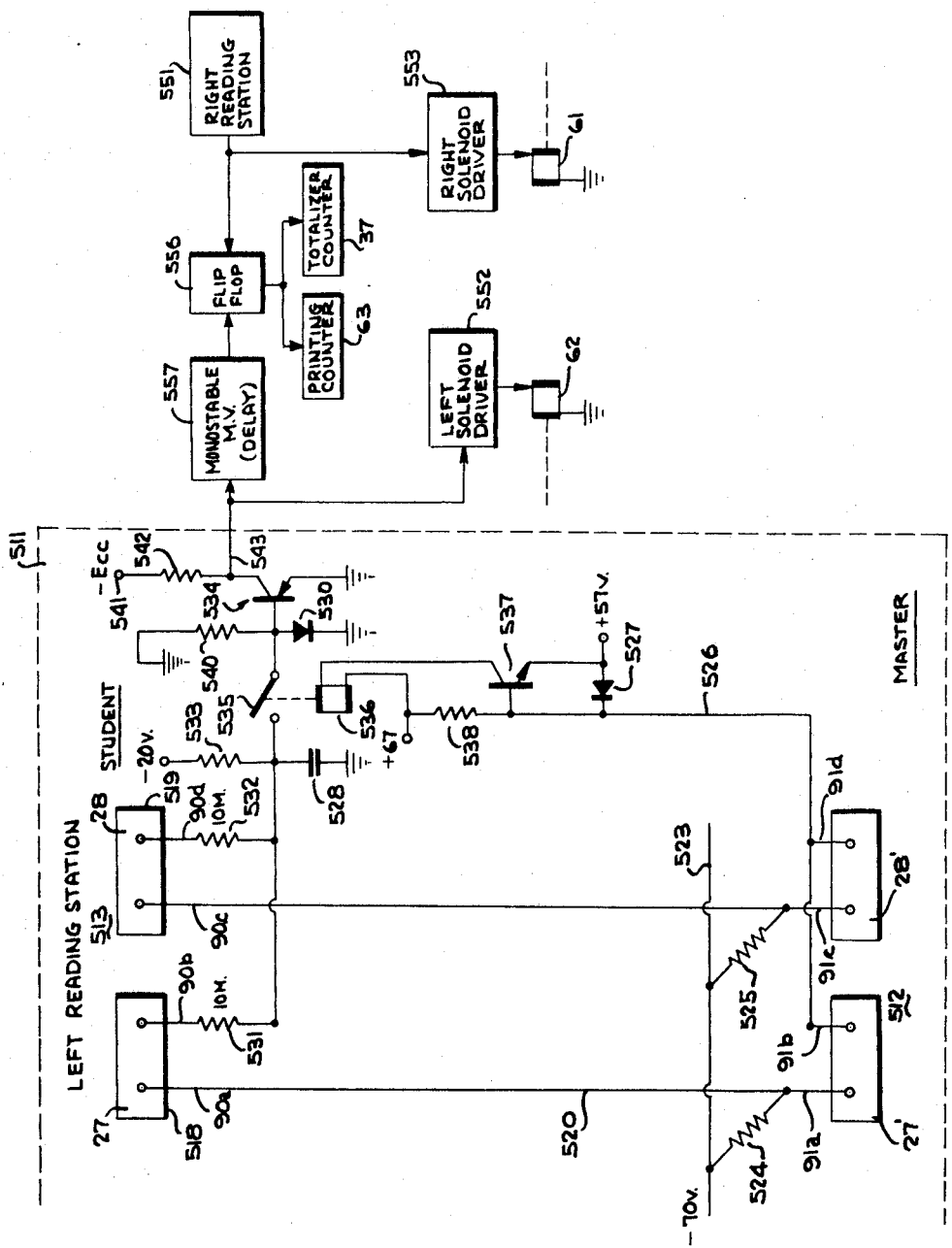
FIG. 53 is a partial circuit and partial block diagram of the machine logic.

Reference is now made to FIGURE 53 of the drawings, wherein is shown a partially schematic and partially block diagram of the grading or logic section employed in the present invention. Since the left and right reading stations, i.e., the stations to derive information indicative of the right and wrong answers in the right and left columns, i.e. the answer spaces to the right of columns 25, 26 and 25', 26' (FIGS. 41, 50 and 51), are identical, a description of the left reading station alone suffices to describe the circuits.

Left reading station 511 includes two sets of reading substations 512 and 513, one for the master sheet 24 and one for the student sheet 23. The master reading substation 512 is illustrated as having two sets of insulated reading brushes 91a, 91b and 91c, 91d below which teacher or master answer spaces 27' and 28', respectively, pass while the student substation 513 is illustrated as including two sets of insulated reading brushes 90a, 90b and 90c, 90d below which pass student answer spaces 27 and 28. While answer spaces for only two alternative answers, such as in a true and false test, are now described and illustrated in FIG. 53 for both the master and student positions, it is to be understood that any appropriate number of spaces, such as five for a multiple choice test (FIGS. 41, 50 and 51), may be employed, the only criteria being that the number of master and student answer spaces be the same.

Brushes 90a, 91a, 90c and 91c are energized by minus 70 volt bus 523 via one-half megohm resistors 524 and 525, respectively. Brushes 91b and 91d are energized by a positive potential applied to bus 526 by the plus 57 volt source connected to the bus through the anode cathode path of diode 527.

To read information indicative of correct and incorrect answers on the student sheet 23, brushes 90b and 90d are connected to storage or charging capacitor 528 through separate 10 megohm resistors 531 and 532, respectively. A minus 20 volt source is connected to the undergrounded end of capacitor 528 through resistor 533 to bias the capacitor when no potential is applied thereto from resistors 531 and 532. Capacitor 528 is normally PNP transistor 534 through the contacts 535 of normally energized relay 536. Energization control for relay 536 is obtained in response to the conducting or nonconducting state of NPN type transistor 537, having its collector connected through coil 536 to a voltage source of +67 volts. The 67 volt source is also connected to normally forward bias the base of transistor 537 through resistor 538.

To describe the operation of the left reading station 511, it is initially assumed that the student has filled in an electrically conducting mark or answer 54 with a typical soft graphite pencil at a point corresponding with a conducting mark 56 on the master sheet. As an example, assume that the student answer 54 appears in space 27 and the master answer appears in space 27', as illustrated by line 7 on the sheets shown in FIG. 41. As brushes 91a, 91b pass above answer space 27', the −70 volt source on bus 523 is applied to the base of transistor 537 through resistor 524 and the conductive path formed by mark 56 through space 27'. Thereby, transistor 537 is driven into cut off, since its base is driven to a voltage lower than the plus 57 volts at its emitter. Transistor 537 is driven into cut off for each of the answer positions because it is presumed, a priori, that a current path exists from bus 523 to its base because either one of answer spaces 27'–28' on master sheet 24 is filled in with mark 56. When transistor 537 is cut off, relay 536 is de-energized to open contacts 535 and disconnect capacitor 528 from the base of transistor 534 for the entire time that answer spaces 27' and 28' are beneath brushes 91a, 91b and 91c, 91d.

Under the assumed conditions, a conduction path exists from the +57 volt source through diode 527, marks 27 and 27' to capacitor 528 via resistor 531. This conduction path is of sufficiently low impedance to overcome the negative bias applied to brush 91a and bus 523 so that the voltage at brush 90a and 91a is positive. The resulting positive current flow through resistor 531 is sufficient to neutralize the effects of the −20 volt source connected to resistor 533 so the charge accumulated on capacitor 528 is positive.

When answer space 27' is no longer beneath fingers 91a, 91b, the base of transistor 537 is again rendered into a conducting state, relay 536 is energized and contacts 535 close. The positive charge accumulated on capacitor 528 is now quickly discharged through the low impedance path of diode 530 shunting the emitter base path of transistor 534, which remains in a nonconducting state. Hence, there are no substantial charges in the base or collector voltages of transistor 534 relative to the voltages at the time that relay contacts 535 are open. After the positive charge accumulated upon capacitor 528 has been dissipated through diode 530, transistor 534 remains in a nonconducting condition because of the relative resistance of resistor 533 and 540, which are in the preferred embodiment 22 megohms and 1000 ohms, respectively.

If it is assumed in the first instance that the student answer does not agree with the master answer the next time brushes 90 and 91 encounter marking spaces 27, 28 and 27', 28' (illustrated by line 6 on the sheets shown in FIG. 41), the operation is as follows. The negative voltage i.e. −70 volts, on bus 523 causes current to flow through the series impedance comprising resistor 525, answer space 28 and resistor 532 to capacitor 528. There is no current flow from the +57 volt source connected to diode 527 to capacitor 528, because of the relatively infinite impedance of nonmarked student space 27 between brushes 90a and 90b. Hence, there is an accumulation of negative charge across the plates of capacitor 528 for the entire time duration in which the reading brushes engage the answer spaces.

If it is assumed in the second instance that the student has marked two spaces whereby the master has a mark in space 27' while the student sheet has a mark in both spaces 27 and 28 (illustrated by line 5 on the sheets shown in FIG. 41), the operation is as follows. As in the first instance, there is a negative charge applied across the plates of capacitor 528 for the entire time duration in which the reading brushes engage the answer spaces. The amount of such charge is reduced to the difference between +57 volts and −70 volts, because the current driven by the positive 57 volt source flowing through spaces 27 and 27' is less than the current driven by the negative 70 volt source flowing through resistor 525 and space 28 to capacitor 528.

A wrong answer is given in the third instance if the student fails to mark any of the answer spaces 27 or 28, illustrated by line 4 on the sheets shown in FIG. 41. Under such circumstances, capacitor 528 is charged through resistor 533 from the −20 volt source when relay contacts 535 are opened in response to brushes 91a, 91b, or 91c, 91d detecting an answer in either of the master answer spaces 27' or 28'.

After answer space 27' moves away from reading brushes 91a, 91b, relay 536 is energized and the negative charges on capacitor 528 in any of the manners described above is quickly dissipated through the low impedance base emitter path of transistor 534. The resulting discharge from capacitor 528 through transistor 534 is of high amplitude and short duration, lasting for approximately 10 to 20 microseconds. Hence, the maximum current derived from capacitor 528 during the discharge cycle is considerably in excess of the low current applied thereto when the marks are being read so a significant "current gain" is achieved to pulse transistor 534 into saturation. With transistor 534 so driven, a positive going pulse is derived at its collector on output lead 543 of left reading station 511. The positive pulse on lead 543 indicates that a wrong answer has been given at the student answer spaces 27 or 28.

As time progresses, the voltage across capacitor 528 decreases, because of the voltage divider comprising resistors 533 and 540. Hence, transistor 534 is biased to its former, non-conducting state, so its collector returns to the original negative voltage.

It is thus seen that a positive pulse is derived at the collector of transistor 534 for each occurrence of a wrong answer at the student answer space, whether the wrong answer be as a result of (1) failure to fill in the correct space, (2) filling in more than one space, or (3) no space at all being marked. In a similar manner, positive pulses are derived from right reading station 551 whenever an incorrect answer occurs thereon.

The positively going pulses deriving from left and right reading stations 511 and 551 are applied to left and right solenoid drivers 552 and 553, respectively. Solenoid drivers 552 and 553, power amplifiers for the voltage pulses deriving from the reading stations, activate marking solenoids 62 and 61 to place for instance a mark 58 adjacent row 10 on student sheet as illustrated in FIGURE 41, whenever a wrong answer appears. When a right answer occurs, the marking solenoids are not activated so no indication is provided on the student sheet for a correct answer. It will be obvious to one skilled in the art to modify this system to mark only correct student answers, while placing no mark 58 adjacent wrong answers.

To provide an indication of the number of incorrect answers for each student sheet 23, reading stations 511 and 512 feed flip-flop 556, the left reading station feeding the flip-flop through monostable multivibrator or delay circuit 557. In response to the derivation of a positive going pulse from reading station 511 on lead 543, multivibrator 557 generates a negative going wave of predetermined duration at its output. After the predetermined duration has elapsed a positive going wave is developed and applied to one input of flip-flop 556. Since flip-flop 556 is responsive only to positive going waves from both reading station 551 and multivibrator 557, it generates an output in response to a wrong answer from station 511 only subsequent to the application thereto of a possible wrong answer from station 551. Marking counter 63 and totalizing counter 37, both responsive to the output of flip-flop 556, are activated each time the flip-flop changes state so the number of wrong answers on each student's sheet and on all the student's sheets are respectively accumulated thereby. Printing counter 63 is reset to zero after each sheet has been graded, as described infra with reference to FIG. 54, while counter 37 is reset manually by activation of button 38 when all of the student's sheets of interest have been graded.

If a wrong answer occurs in the left and right reading stations 511 and 551 at the same time, flip-flop 556 immediately changes state in response to the output of station 551 and counter 63 is activated. A predetermined time period after flip-flop 556 changes state in response to the leading edge of the pulse from station 551 it reverts back to its original state in response to the positive going voltage applied thereto from delay element 557. Hence, counter 63 is activated at two separate times even if wrong answers simultaneously occur in the left and right column. Of course, if there is no output from either station 511 and 551, counter 63 is not activated and it is activated only once if one wrong answer is detected by one of the stations 511 or 551.

Programming unit

To more comprehensively describe the sheet feeding, master sheet loading, and jam sensing operation, as generally described, supra, reference is now made to FIG. 54, which is a schematic diagram for controlling feed motor 201 and drum drive motor 77.

Terminals 563 and 564 are connected to a standard source of 115 volt, 60 cycle current, which is selectively connected to the network through five-position switch 565. Switch 565 includes six separate insulated contact segments 566-571, the relative positions which are controlled by the buttons 44, 50, 67, 68 and 69, carried by top door 20. To enable the switch connections to be easily understood, matrix 573 is presented to the left of switch assembly 565. In the first switch position, the machine is "off," and no connections exist between the separate switching segments 566-571, so paper feed and drum drive motors 201 and 77 as well as power supply 574 for the grading section illustrated in FIGURE 53 is not energized.

When it is desired to load the master sheet 24 into the machine 1, "Master Install" button 44 is depressed, whereby sensing switch 565 to be activated into its "Master Install" or second position whereby contacts 568 and 570 engage contact 566. When switch 565 is in its second position, AC power is supplied through contacts 566 and 568 to armature 575 of load position switch 99. Aramature 575 normally engages contacts 577 and thus completes a circuit through motor 77 to terminal 564, except during the small portion of the drum rotational cycle when armature 575 is driven into engagement with open circuited contact 578 by gate cam 73, carried on the side of master drum 45, as is illustrated generally by FIGURES 9 and 52. When armature 575 is moved into engagement with open circuited contact 578 by gate cam 73, power is removed from master drum 45 and the drum immediately stops at the proper position for loading the master sheet 24 onto or removing it from the master drum.

Also, when switch 565 is in its second position, current is supplied to the field winding of feed motor 201 through contact 570 and loop switch 199. When a loop 250 is formed in the sheet 23, as illustrated in FIGURE 34, armature 581' of switch 199 is forced out of engagement with contact 582' and into engagement with open circulated contact 583'. Feed motor 201 thus runs continuously when switch 565 is in the "Master Install" position, and no student sheet 23 is in position to form loop 250.

It is desirable that the student sheets be fed into the machine immediately after the master sheet is loaded on drum 45. Accordingly, the sheets are first placed in the paper tray 39, prior to activation of switch 565 to the second position. This enables a loop 250 to be formed in the top student sheet feed forward from stack 3, so that pins 51 and 52 are able to engage the registering openings 32 and 33 in the sheets, immediately after drum rotation commences again in response to activation of switch 565 to its "Grade" or third position. Of course, feed motor 201 stops as soon as a loop 250 is formed, because contacts 581' and 582' are opened in response to loop formation.

To unload the master sheet 24 from the drum 45, switch 565 is actuated to its fourth or "Master Remove" position, whereby contact 566 engages contact 568. Thus, current is applied to the winding of drum motor 77 through switch 99, until the switch is actuated by cam 73, forcing armature 575 into engagement with open circuited contact 584. The resultant position of the master drum 45 is coincident with its "Master Install" position so a single switch 99 may be utilized for both installing and removing the master sheets. It will be noted that the depression of "Master Remove" button 67, does not cause actuation of feed motor 201.

In order to clearly reference the successive steps of the grading and jam sensing operations, it will be assumed that when the "Grade" button 50 is depressed to start the grading operation, master drum 45 is at its "Master Install" position. By referring to FIGURE 11, it will be seen, that in this initial or starting position, motor drive switch 100 and jam check switch 101 "ride on" or are under the influence of the circular portion 264 of the plate cam 71. Thus, as seen in FIGURE 54, armature 581 and contact 583 of switch 100 are engaged, and armature 604 and contact 605 of switch 101 are engaged. Also, in this position of the master drum, the student pins 51 and 52 are in position to approach paper tray 39, as shown generally in FIGURES 10 and 34.

It will be further assumed that prior to depressing "Master Install" button 44 to move drum 45 to the master install position, a stack of ungraded student sheets 3 has been placed in paper tray 39, so that upon depressing button 44, the topmost sheet 23 in stack 3 is separated therefrom and feed forward by feed wheels 196 and 197 into contact with primary gate 198, in such a manner as to form loop 250, thereby actuating loop sensing switch 199. It will be appreciated that before loop switch 199 is actuated to deenergize feed motor 201, current also passes via switch 199 to terminal 564 through coil 591. With coil 591 thus actuated, its associated switches 592 and 593 are energized. When switches 592 and 593 are energized, armature 597 engages contact 599, and armature 594 engages contact 596. Upon the actuation of loop sensing switch 199, as heretofore described, coil 591 is deenergized to move armature 597 of switch 593 into engagement with contact 598 and armature 594 into engagement with open circuited contact 595.

The grading operation is now initiated by depressing the "Grade" button 50, whereby switch 265 is moved to its third or "Grade" position, causing contact 566 to engage contact 569 and contact 571 to engage contact 567. While the "Grade" button is so actuated, AC current is supplied from terminal 563 through contacts 566 and 569 to power supply 574 for the electronic circuit, illustrated in FIGURE 53, the other side of which is returned to terminal 564.

Also upon depressing button 50, power is immediately supplied to the winding of drum drive motor 77, as illustrated in FIGURE 54, through a first drum drive motor energizing circuit comprising contacts 566, 569, armature 581, contact 583, and contacts 567 and 571. It will be seen that contact 583 of drive motor switch 100, in addition to being connected to contact 567, is returned to terminal 564 through relay coil 585, whereby coil 585 is actuated whenever armature 581 engages contact 583. Coil 585, when actuated, drives armature 607 into a position to close the circuit from contact 605 of the jam check switch 101 to the negative 6 volt source at terminal 608, and drives armature 586 into engagement with contact 587.

Now, as the student pins move toward paper tray 39 (this point could also be defined as being immediately after the point in time at which a loop 250 would normally be formed in a sheet 23, during each subsequent grading cycle), jam check switch 101 is actuated by the depression 267 in plate cam 71 to cause armature 604 to move into engagement with contact 606. Ganged with armature 604 is armature 621, which normally engages contact 622 and is activated to engage contact 623, simultaneously and synchronously with engagement of armature 604 with contact 606. When armature 621 is in engagement with contact 622, the voltage at the latter is coupled to counter 63. This voltage resets printing counter 63 to zero so it is ready for the next student sheet.

Upon switch 101 being actuated to force armature 604 into engagement with contact 606, capacitor 609 is charged by positive 57 volt source at terminal 602 via contact 606 and armature 604 of switch 101, resistance 612, and contact 598 and armature 597 of switch 593.

Upon further rotation of master drum 45, the student pins pick-up student sheet 23 and begin to draw the sheet onto the drum, whereby reducing the height of loop 250 and actuating loop sensing switch 199 to cause armature 581' to engage contact 582'. Thus, a feed motor energizing circuit is established from contact 569 through armature 586, contact 587, armature 581', contact 582', feed motor 201 to terminal 564. Concurrently therewith, coil 591 is energized by current passing from contact 569 via loop switch 199 and coil 591 to terminal 564. Coil 591 upon being energized, forces armature 597 into engagement with 599 and forces armature 594 into engagement with contact 596.

Immediately after loop 250 is partially dissipated to effect actuation of loop switch 199, the jam check switch 101 "rides out" of depression 267 and onto the circular portion 264 of plate cam 71, to thereby force armature 604 into engagement with contact 605. Thus there is established a circuit from the previously charged capacitor 609 through armature 597, contact 599, the anode of diode 613, relay coil 601, armature 604, contact 605, and armature 607 to terminal 608. This permits capacitor 609 to discharge through relay coil 601, which is thereby energized. Upon energization of relay coil 601, armature 616 is caused to move to a position whereby the positive 10 volt source at terminal 615 is connected to the negative 6 volt source at terminal 608, via the anode of diode 614, relay coil 601, armature 604, contact 605 and armature 607, thereby establishing a holding or locking circuit for relay 601. It will be noted that capacitor 609 is not charged by the positive 10 volt source, because the cathode of diode 613 is connected to the cathode of diode 614. Also, it will be noted that upon energization of relay 601, armature 617 is driven into engagement with contact 618. Armature 617 is permanently connected 583 of drive motor switch 100 and to terminal 564 via coil 585. Accordingly, upon the engagement of armature 617 with contact 618, a second drive motor energizing circuits is established from contact 569, through armature 586, contact 587, switch 592, contact 618 and armature 617 to contact 567. Also, upon engagement of armature 617 with contact 618, a holding or locking circuit is established for relay coil 585 from contact 569 armature 586, contact 587, switch 592, contact 618, armature 617, and coil 585 to terminal 564.

Upon further rotation of the master drum 45, drive motor switch 100 "rides into" depression 267 in plate cam 71, thereby causing armature 581 to be driven into engagement with open circuited contact 584. Thus, the first drum driven motor energizing circuit is broken. During a normal grading cycle, the drum motor 77 would remain energized, because of the previously formed second drum drive motor energized circuit. Also, during a normal grading cycle coil 585, which is connected to now disconnected contact 583, would remain energized via switch 592, armature 617 and contact 618.

Immediately after the drive motor switch 100 is actuated by depression 267 in plate cam 71, the first student answers on sheet 23 are in position to be sensed by student brushes 90. Now, under normal operating conditions, the master drum will continue to rotate to permit sensing of all the student answers, stripping of sheet 23 for the drum, and drive motor switch 100 to ride out of depression 267 of plate cam 71, thereby causing armature 581 to reengage contact 583 to reestablish the first drum motor energizing circuit.

This completes the first normal grading cycle, initialed by the depression of "Grade" button 50. The machine will continue to grade each of the student sheets in stack 3, until the supply of sheets is exhausted or until one of two possible jam conditions occurs. The machine is adapted to shut itself off when either there are no sheets remaining in paper tray 39 or, when there are sheets remaining, if a sheet is not properly fed forward, i.e. the first jam condition. In either case the condition sensed is the absence of paper loop 250, as the student pins approach the paper tray 39. Without a loop 250 being formed, armature 581' will continue to engage contact 582', thereby maintaining coil 591 energized through a complete drum rotational cycle. With coil 591 so energized, armature 597 will be maintained in engagement with contact 599, thereby preventing the charging of capacitor 609, when jam check switch 101 rides into depression 267 of plate cam 71 to force armature 604 into engagement with contact 606 which is associated with the positive 57 volt source at terminal 602. It will be appreciated that when armature 604 is so actuated, the self-locking circuit of coil 601, passing from the positive 10 volt source at terminal 602 through switch 101 to negative 6 volt source at terminal 608, is broken, thereby deenergizing coil 601. With 601 being maintained in a deenergized state, armature 617 is not forced into engagement with contact 618. Accordingly, neither a holding or locking circuit for coil 585, or a second drum motor energizing circuit through coil 585, contact 618 and armature 617 is established. Thus, when master drum 45 moves to the point where drive motor switch 100 is actuated by depression 267 in plate cam 71, whereby disengaging armature 581 from contact 583, both coil 585 and drive motor 77 are deenergized. With coil 585 deenergized, engagement between armature 586 and contact 587 is broken to deenergize the feed motor 201.

As noted, a second abnormal condition or jam is sensed if a loop 250 is present when the student pins 51 and 52 are moving away from paper tray 39, i.e. the student pins have missed sheet 23 or the sheet has become jammed in the machine. When such an abnormal condition exists power will be removed from the drum drive motor 77, since the first drum drive motor energizing circuit through switch 100 is broken by plate cam 71, forcing armature 581 into engagement with open-circuited contact 584, at the same time that the second drum drive motor energizing circuit through switch 592 and coil 585 is broken, because coil 591 is not energized. Of course, feed motor 201 is already deenergized because of the presence of loop switch opening loop 250.

If it is desired to rotate drum 45, when switch 565 is in any of positions 1–4, the switch is activated to its fifth of "Clear" status. In the "Clear" position, contacts 566 and 571 are connected together establishing a current path between terminals 563 and 564 through motor 77. For service and jam removing purposes this is highly desirable since the drum can run continuously or to any desired position as long as the button 78 is depressed. To enable the selected cycle to be automatically continued after the fifth position is deactivated, depression of the fifth button 68 does not release the buttons associated with positions 1–4, i.e. 44, 50, 67 and 69.

Incidental features

While not absolutely necessary to the proper functioning of machine 1, several mechanical features are now discussed in order to more completely describe the machine of the present invention.

As will be seen by reference to FIGURES 8 and 11 the top door 20 is pivotally connected to side plates 6 and 7 by pins 270 and 271. Top door 20 is adapted to be supported in open position, shown in phantom in FIGURE 8, by pivotal linkage having arms 272 and 273, which are respectively connected at the outwardly extending ends to top door 20 by pin 274 and side plate 6 by pin 275. Top door 20 may be locked in closed position, as shown in FIGURE 8, by lock member 276. Member 276 is adapted to be pivotally supported at its lower end by secondary gate shaft 207 and comprises a forwardly extending flange portion 277 and lip portion 278. Spring 279 acts to normally bias member 276 forwardly into abutting contact with a right flange 280 of a pair of flanges 280 and 281, which are affixed to side plates 7 and 6, respectively. In this position lip portion 278 is adapted to overlie flange 282 which is carried by top door 20 and supported on flanges 280 and 281 when the top door is in closed position. When it is desired to open top door 20 to permit inspection or maintenance of machine 1, an operator presses on flange portion 277, thus pivoting locking member backwardly about shaft 207 to remove lip portion 278 from overlying locking engagement with door flange 282.

Referring now to FIGURES 8, 11 and 12, it will be seen that the master brush assembly 55, which is supported on shaft 283, may be adjustably positioned with respect to master drum 45. Positioning is effected by means of brackets 284 and 285, carried by shaft 283, brackets 286 and 287, carried by side plates 6 and 7, a pair of slot openings 288 and 289, disposed in side plates 6 and 7, and adjusting screws 290 and 291. Thus it will be seen that turning screws 290 and 291 causes movement of brackets 284 and 285 relative to brackets 286 and 287, thus permitting the respective ends of shaft 283 to slide within slot openings 288 and 289. In all positions of shaft 284 spring 292 acts to maintain brushes 91 in contact with the surface of master drum 45. It will be apparent that there is no necessity from pivoting master brushes 91, as was the case for the student brushes 90 described above, because shroud sheet 89, which is wrapped completely about the surface of master drum 45, permits brushes to ride off of rather than onto all projections above the surface of the master drum.

Further, as is shown in the drawings in FIGURES 6 and 7, suitable top sheet guides 293, 294 and 295, and bottom sheet guides 296, 297 and 298, may be provided to properly position student sheets 23 and master sheet 24 with respect to the surface of master drum 45.

While there has been shown and described the fundamental novel features of the present invention, as applied to a single embodiment, it will be understood that various omissions and substitutions in the form or details of the machine illusrtated and in its operation may be made by persons skilled in the art without departing from the spirit of the invention. Exemplary of such changes would be to directly imprint the outline of a master sheet on the master drum and fill in appropriate areas with erasable electrically conductive material or permanently imprint electrically conductive material on appropriate areas of the master drum surface. This invention, is therefore only to be limited by the scope of the following claims.

We claim the following:

1. In a system for indicating whether a conducting mark selectively located in one of a plurality of areas on a sheet being examined coincides with a conducting mark located in one of a plurality of areas on a master indicator, comprising a voltage source of one polarity relative to a reference potential, a voltage source of another polarity relative to said reference potential, an energy storing reactance, means for selectively establishing conducting paths through the areas on said sheet and said indicator from said sources to said reactance, the selected path applying a voltage of said first polarity to said reactance when the positions of the conducting marks coincide and applying a voltage of said second polarity to said reactance when the positions of the conducting marks do not coincide, means for discharging said reactance only after the conducting path through the mark on the master is extinguished, and means for sensing the discharge from the reactance.

2. The system of claim 1, wherein said reactance is a capacitance.

3. The system of claim 1 including means for applying another voltage of said second polarity to said reactance when a conducting mark on said indicator is sensed, said another voltage supplying less current to said reactance than the voltage of said first polarity when the positions of the conducting marks coincide.

4. In a system for indicating whether a conducting mark selectively located in one of a plurality of areas on a sheet being examined coincides with a conducting mark located in one of a plurality of areas on a master indicator, comprising a voltage source of one polarity relative to a reference potential, a voltage source of another polarity relative to the reference potential, a readout impedance, means for selectively establishing conducting paths through the areas on said sheet and said indicator from said sources to said impedance, the selected path applying a voltage of said first polarity to said impedance when the positions of the conducting marks coincide and applying a voltage of said second polarity to said impedance, when the positions of the conducting marks do not coincide, and means for sensing a predetermined current flow through said impedance.

5. The system of claim 4 including means for simultaneously sensing a pair of output impedances in response to the simultaneous comparison of two conducting mark positions on the sheet being examined with two conducting mark positions on the master indicator, said means for sensing including means for deriving pulses in response to a predetermined current flow through said impedance, a counter responsive to the pulses from both of said sensing means, and means for delaying the application of the pulses from one of said sensing means relative to the pulses from the other sensing means to said counter.

6. In a system for indicating whether a conducting mark selectively located in one of a plurality of areas on a sheet being examined coincides with a conducting mark located in one of a plurality of areas on a master indicator, comprising a voltage source of one polarity relative to a reference potential, a voltage source of another polarity relative to the reference potential, an energy storing reactance, means for selectively establishing high impedance conducting paths through the areas on said sheet and said indicator from said sources to said reactance, the selected path applying a voltage of said first polarity to said reactance when the positions of the conducting marks coincide and applying a voltage of said second polarity to said reactance when the positions of the conducting marks do not coincide, low impedance means for discharging said reactance only after the conducting path through the mark on the master is extinguished, and means for sensing the discharge from the reactance.

7. In a system for indicating whether a conducting mark selectively located in one of a plurality of areas on a sheet being examined coincides with a conducting mark located in one of a plurality of areas on a master indicator, comprising a voltage source of one polarity relative to a reference potential, a voltage source of another polarity relative to the reference potential, an energy storing reactance, means for selectively establishing conducting paths through the areas on said sheet and said indicator from said sources to said reactance, the selected path applying a voltage of said first polarity to said reactance when the positions of the conducting marks coincide and applying a voltage of said second polarity to said reactance when the positions of the conducting marks do not coincide, means for discharging said reactance only in response to extinction of the conducting path through the mark on the indicator, and means for sensing the discharge from the reactance.

8. A system for examining sheets having conducting marks thereon indicative of recorded information comprising a rotating drum for carrying a master indicator with conducting marks thereon, means for feeding one of said sheets onto said drum at a time, circuit means for sensing the positions of the conducting marks on said master indicator relative to the positions of the marks on the sheet carried by the drum, said circuit means being activated in response to current flowing through the conducting marks on said master indicator and the sheet carried by the drum, and means responsive to said circuit means for indicating the relative positions of said marks.

9. In a system for indicating whether a mark selectively located in one of a plurality of areas on a sheet being examined coincides with a mark located in one of a plurality of areas on a master indicator, comprising: means for sensing each of said areas on said sheet; separate means for sensing each of said areas on said master indicator; a voltage source of one polarity relative to a reference potential; a voltage source of another polarity relative to said reference potential; an energy storing reactance; means for selectively establishing conductive paths through each said sheet sensing means and each said master sensing means in accordance with the placement of marks in said areas being sensed on said sheet and said master indicator from said sources to said reactance, the selected path applying a voltage of said first polarity to said reactance when the positions of said marks coincide and applying a voltage of said second polarity to said reactance when the positions of said marks do not coincide; means for discharging said reactance after said conducting path through said master sensing means responsive to said mark on said master is extinguished; and means for sensing the discharge from said reactance.

10. The system of claim 9, wherein said reactance is a capacitance.

References Cited

UNITED STATES PATENTS 3,201,569  8/1965  Conron _____ 235—61.7
3,212,203  10/1965  Atkinson _____ 235—61.6 X DARYL W. COOK, Primary Examiner